(12) United States Patent
Mazuir et al.

(10) Patent No.: US 11,579,506 B1
(45) Date of Patent: Feb. 14, 2023

(54) TRANSPARENT STRUCTURE WITH CONTROLLABLE LIGHTING

(71) Applicants: Clarisse Mazuir, San Jose, CA (US); Matthew E. Last, San Jose, CA (US); Ryan J. Garrone, San Francisco, CA (US); Budhadipta Dan, San Jose, CA (US); Khadijeh Bayat, Santa Clara, CA (US); Gregory A. Cohoon, Sunnyvale, CA (US); Jack E. Graves, Cupertino, CA (US)

(72) Inventors: Clarisse Mazuir, San Jose, CA (US); Matthew E. Last, San Jose, CA (US); Ryan J. Garrone, San Francisco, CA (US); Budhadipta Dan, San Jose, CA (US); Khadijeh Bayat, Santa Clara, CA (US); Gregory A. Cohoon, Sunnyvale, CA (US); Jack E. Graves, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/746,561

(22) Filed: May 17, 2022

Related U.S. Application Data

(63) Continuation of application No. 17/151,378, filed on Jan. 18, 2021, now Pat. No. 11,372,303, which is a
(Continued)

(51) Int. Cl.
*G02F 1/137* (2006.01)
*F21V 8/00* (2006.01)
(Continued)

(52) U.S. Cl.
CPC ............... *G02F 1/137* (2013.01); *E06B 9/24* (2013.01); *G02B 6/001* (2013.01); *G02B 6/0006* (2013.01);
(Continued)

(58) Field of Classification Search
CPC .......... G02F 1/137; G02F 1/1334; E06B 9/24; E06B 2009/2417; E06B 2009/247;
(Continued)

(56) References Cited

U.S. PATENT DOCUMENTS 5,025,602 A 6/1991 Baughman et al.
5,390,045 A 2/1995 Bernard, Jr.
(Continued)

FOREIGN PATENT DOCUMENTS

DE 102011009229 A1 7/2012
JP 2004191401 A 7/2004
(Continued)

OTHER PUBLICATIONS

Siler, Wes., "Mercedes Dual-View Front Seat Screen Finally US-Bound", Jalopnik, Car Gadgets, Dec. 9, 2009 (8 pp).
(Continued)

*Primary Examiner* — Anne M Hines
*Assistant Examiner* — Jose M Diaz
(74) *Attorney, Agent, or Firm* — Young Basile Hanlon & MacFarlane, P.C.

(57) ABSTRACT

Aspects of the present disclosure involve a transparent structure. The structure may include at least one light source, a transparent light-carrying guide layer optically coupled with the at least one light source. The structure may include refractive layers where a light absorbing feature is operably associated with the light-carrying guide layer to absorb any light not internally reflected in the light guide layer, at least adjacent the light source.

20 Claims, 22 Drawing Sheets

Related U.S. Application Data continuation of application No. 16/441,237, filed on Jun. 14, 2019, now Pat. No. 10,928,697, which is a continuation of application No. 16/039,641, filed on Jul. 19, 2018, now Pat. No. 10,338,448, which is a continuation of application No. 15/366,686, filed on Dec. 1, 2016, now Pat. No. 10,048,560.

(60) Provisional application No. 62/397,826, filed on Sep. 21, 2016, provisional application No. 62/346,378, filed on Jun. 6, 2016, provisional application No. 62/299,751, filed on Feb. 25, 2016, provisional application No. 62/261,778, filed on Dec. 1, 2015.

(51) Int. Cl.
*G02F 1/1334* (2006.01)
*E06B 9/24* (2006.01)

(52) U.S. Cl.
CPC ......... *G02B 6/0028* (2013.01); *G02B 6/0055* (2013.01); *G02B 6/0068* (2013.01); *G02F 1/1334* (2013.01); *E06B 2009/247* (2013.01); *E06B 2009/2417* (2013.01)

(58) Field of Classification Search
CPC .... G02B 6/0006; G02B 6/001; G02B 6/0028; G02B 6/0055; G02B 6/0068
See application file for complete search history.

(56) References Cited

U.S. PATENT DOCUMENTS

| | | | |
|---|---|---|---|
| 5,583,350 A | 12/1996 | Norman et al. | |
| 5,834,765 A | 11/1998 | Ashdown | |
| 5,995,070 A | 11/1999 | Kitada | |
| 6,700,692 B2 | 3/2004 | Tonar et al. | |
| 6,762,436 B1 | 7/2004 | Huang et al. | |
| 6,819,367 B1 | 11/2004 | Cava | |
| 6,880,276 B2 | 4/2005 | Strein et al. | |
| 6,974,940 B2 | 12/2005 | Su et al. | |
| 7,576,727 B2 | 8/2009 | Bell | |
| 8,044,784 B2 | 10/2011 | Ghannam et al. | |
| 8,102,586 B2 | 1/2012 | Albahri | |
| 8,362,696 B2 | 1/2013 | Zheng | |
| 8,380,393 B1 | 2/2013 | Ohtomo | |
| 8,608,317 B2 | 12/2013 | Babst et al. | |
| 8,707,216 B2 | 4/2014 | Wilson | |
| 10,048,560 B1 | 8/2018 | Mazuir et al. | |
| 2003/0210355 A1 | 11/2003 | Dao | |
| 2003/0214616 A1 | 11/2003 | Komoto et al. | |
| 2007/0176402 A1 | 8/2007 | Irie et al. | |
| 2007/0182677 A1 | 8/2007 | Lee et al. | |
| 2008/0112175 A1 | 5/2008 | Bucher | |
| 2008/0315228 A1 | 12/2008 | Krames et al. | |
| 2009/0244413 A1 | 10/2009 | Ishikawa et al. | |
| 2009/0295731 A1 | 12/2009 | Kim et al. | |
| 2010/0277421 A1 | 11/2010 | Charlier et al. | |
| 2010/0295670 A1 | 11/2010 | Sato et al. | |
| 2011/0008062 A1 | 1/2011 | Ashdown | |
| 2011/0025584 A1 | 2/2011 | Nishigasako et al. | |
| 2011/0273409 A1 | 11/2011 | Lee et al. | |
| 2013/0016070 A1 | 1/2013 | Starner et al. | |
| 2013/0030645 A1 | 1/2013 | Divine et al. | |
| 2013/0314453 A1 | 11/2013 | Ko | |
| 2014/0035942 A1 | 2/2014 | Yun et al. | |
| 2014/0185129 A1 | 7/2014 | Kim et al. | |
| 2014/0202643 A1* | 7/2014 | Hikmet | B60J 1/2019 160/310 |
| 2014/0204023 A1 | 7/2014 | Kumar et al. | |
| 2014/0276090 A1 | 9/2014 | Breed | |
| 2014/0293188 A1 | 10/2014 | Chen et al. | |
| 2014/0320755 A1 | 10/2014 | Martinez et al. | |
| 2014/0320782 A1 | 10/2014 | Uhm et al. | |
| 2015/0002563 A1 | 1/2015 | Chen et al. | |
| 2015/0002781 A1 | 1/2015 | Ma | |
| 2015/0077555 A1 | 3/2015 | Scalisi | |
| 2015/0253594 A1 | 9/2015 | Roberts et al. | |
| 2016/0041317 A1 | 2/2016 | Kim et al. | |
| 2017/0045666 A1 | 2/2017 | Vasylyev | |
| 2017/0073075 A1 | 3/2017 | Gagnon et al. | |
| 2017/0310956 A1 | 10/2017 | Perdices-Gonzalez et al. | |
| 2018/0048343 A1 | 2/2018 | Landry | |

FOREIGN PATENT DOCUMENTS

| | | |
|---|---|---|
| JP | 2008000251 A | 1/2008 |
| WO | 2014/108771 A2 | 7/2014 |

OTHER PUBLICATIONS

SAGE Electrochromics, "SageGlass, Product Highlights", 2015 (2 pp).

* cited by examiner

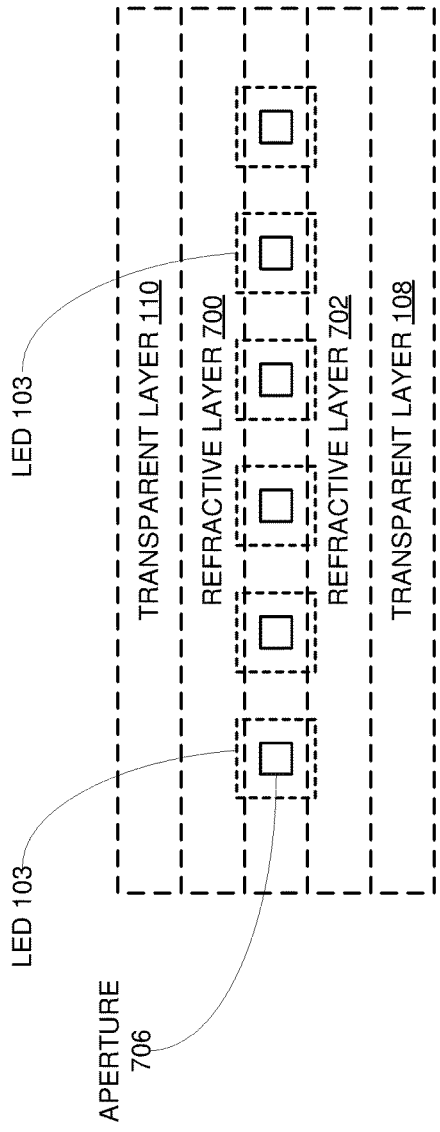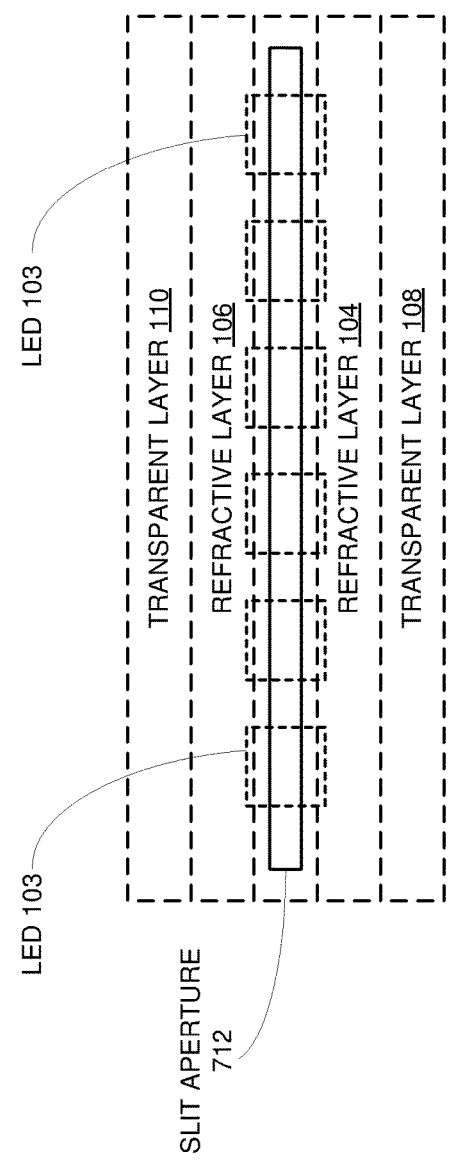
FIG. 7B
FIG. 7C

TRANSPARENT STRUCTURE WITH CONTROLLABLE LIGHTING

CROSS-REFERENCE TO RELATED APPLICATIONS

This patent application is a continuation application of U.S. patent application Ser. No. 17/151,378 filed Jan. 18, 2021, entitled, "TRANSPARENT STRUCTURE WITH CONTROLLABLE LIGHTING", which is a continuation application of U.S. patent application Ser. No. 16/441,237 filed Jun. 14, 2019, entitled "TRANSPARENT STRUCTURE WITH CONTROLLABLE LIGHTING," now U.S. Pat. No. 10,928,697, which is a continuation application of U.S. patent application Ser. No. 16/039,641 filed Jul. 19, 2018, entitled "TRANSPARENT STRUCTURE WITH CONTROLLABLE LIGHTING,", now U.S. Pat. No. 10,338,448, which is a continuation application of U.S. patent application Ser. No. 15/366,686, filed Dec. 1, 2016, entitled "TRANSPARENT STRUCTURE WITH CONTROLLABLE LIGHTING", now U.S. Pat. No. 10,048,560, which is related to and claims priority under 35 U.S.C. § 119(e) to U.S. Provisional Patent Application No. 62/261,778, filed Dec. 1, 2015 entitled "CONFIGURABLE TRANSPARENT STRUCTURE FOR LIGHTING," U.S. Provisional Patent Application No. 62/299,751, filed Feb. 25, 2016 entitled "TRANSPARENT STRUCTURE WITH CONTROLLABLE LIGHTING," U.S. Provisional Patent Application No. 62/346,378, filed Jun. 6, 2016 entitled "TRANSPARENT STRUCTURE WITH CONTROLLABLE LIGHTING," and U.S. Provisional Patent Application No. 62/397,826, filed Sep. 21, 2016 entitled "TRANSPARENT STRUCTURE WITH CONTROLLABLE LIGHTING," all of which are hereby incorporated by reference in their entirety.

TECHNICAL FIELD

This disclosure relates generally to lighting systems, and more specifically to a configurable transparent structure providing lighting capability.

BACKGROUND

Transparent media, such as glass windows or panes, plexiglass panels, and the like, typically facilitate the largely undistorted passage of light to promote vision of objects while preventing other aspects of the environment (e.g., precipitation, wind, some sound) from passing through the media. Further, some newer types of transparent media technology, such as the various versions of "smart glass" now available, may be configured on-the-fly by way of a voltage selected by a user to allow the passage of varying levels and qualities of light, from transparent, to translucent, to opaque. Functional, aesthetic and other demands in countless areas ranging from automotive to architecture are exceeding the capabilities of conventional transparent media technologies.

SUMMARY

One aspect of the disclosure is a transparent structure that includes a light source, a transparent light-carrying layer, and a scattering film. The transparent light-carrying layer is optically coupled with the light source so at least part of the light from the light source is guided through the transparent light-carrying layer by total internal reflection. The scattering film scatters at least part of the light from the light source out of the transparent light-carrying layer to provide illumination.

Another aspect of the disclosure is a transparent structure that includes a first transparent layer, a second transparent layer, a light source, and a transparent light-carrying layer. The transparent light-carrying layer is optically coupled with the light source so at least part of the light from the light source is guided through the transparent light-carrying layer by total internal reflection. The transparent structure also includes a first adhesive layer between the first transparent layer and the transparent light-carrying layer and a second adhesive layer between the first transparent layer and the transparent light-carrying layer. The first adhesive layer includes scattering particles to scatter at least part of the light from the light source out of the transparent light-carrying layer to provide illumination.

Another aspect of the disclosure is a transparent structure that includes a light source and a transparent light-carrying layer. The transparent light-carrying layer is optically coupled with the light source so at least part of the light from the light source is guided through the transparent light-carrying layer by total internal reflection. The transparent light-carrying layer includes scattering particles to scatter at least part of the light from the light source out of the transparent light-carrying layer to provide illumination.

BRIEF DESCRIPTION OF THE DRAWINGS

FIG. 7B is a front-view representation of the structure of FIG. 7A particularly illustrating a plurality of apertures associated with a plurality of light sources.

FIG. 7C is a front-view representation of the structure of FIG. 7A particularly illustrating a slit aperture associate with a plurality of light sources.

DETAILED DESCRIPTION

Aspects of the present disclosure involve configurable transparent structures and methods for operating such structures. In at least some embodiments, the configurable transparent structure may include at least one light source, a transparent light-carrying layer optically coupled with the at least one light source, and a light extraction layer optically coupled with the transparent light-carrying layer. The light extraction layer may be transparent in a first state and at least partially translucent in a second state.

In some embodiments, a method of operating a configurable transparent structure may include accessing a control signal to determine a mode in which the configurable transparent structure is to be operated. Based on a determination that the structure is to be operated in a transparent mode, the light source may be inactivated, and the light extraction layer may be placed in the first state. Based on a determination that the structure is to be operated in an internal diffusion state, the light source may be activated, and the light extraction layer may be operated in the second state. Other modes of operation are also possible.

One or more of the various embodiments described herein may be employed in a vehicle, such as for use as a sunroof or other window-like surface to control the amount and nature of the light being provided within the vehicle. In automotive, architectural, landscaping and numerous other environments, embodiments may be used to provide lighting.

Figure 1:
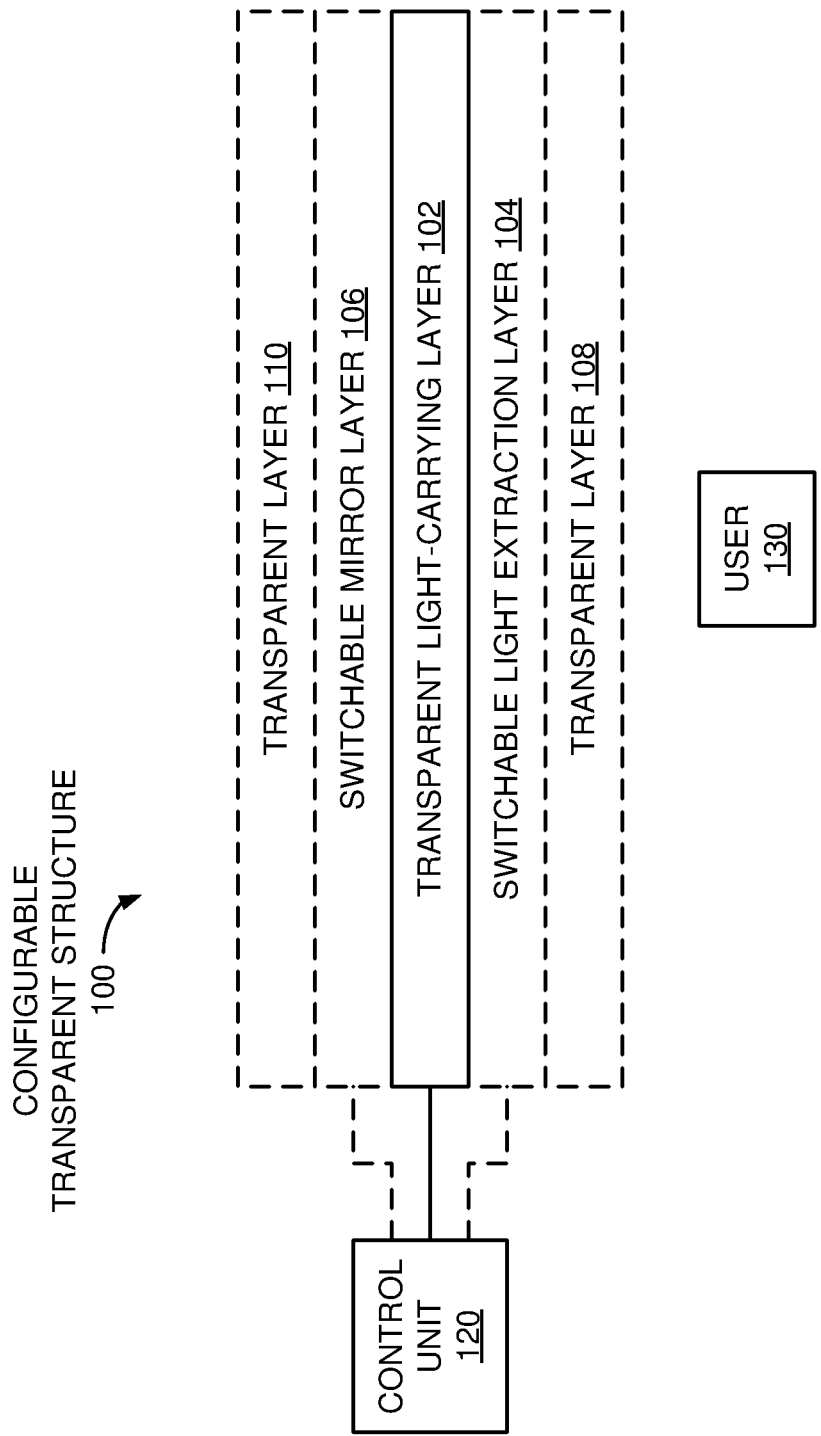
FIG. 1 is a side-view representation of an example configurable transparent structure for lighting and/or display.

FIG. 1 is a side-view representation of an example configurable transparent structure 100 for lighting and/or display. In this example, the configurable transparent structure 100 is oriented horizontally, similar to that of a sunroof of a vehicle, or a skylight of a building or dwelling, under which one or more users 130 may be positioned to view an exterior environment of the vehicle or dwelling. However, the orientation and size of other embodiments of the configurable transparent structure 100 may vary greatly from one example to another, and may be used in any indoor or outdoor environment. Further, while the example of FIG. 1 depicts a planar configurable transparent structure 100, other examples of the structure 100 need not be strictly planar, but may incorporate curved surface portions. Additionally, while one or more of the layers of the configurable transparent structure 100 may be referred to as being or incorporating glass, other transparent media, such as acrylic plastics or glasses, may be utilized in other implementations. Moreover, in vehicle applications, so called laminated safety glass (or portions thereof) may be included.

As depicted in FIG. 1, the configurable transparent structure 100 may include at least a transparent light-carrying layer 102, different examples of which are described below in relation to FIGS. 2A, 2B, and 2C. In some examples, the transparent light-carrying layer 102 may incorporate one or more light sources, such as light-emitting diodes (LEDs), therewithin that may be illuminated under the control of a control unit 120. In other examples, the one or more lights sources may be optically coupled to the transparent light-carrying layer 102, such as by way of one or more edges of the transparent light-carrying layer 102, again under the control of the control unit 120. An example of the control unit 120 is discussed below in conjunction with FIG. 7.

When the at least one light source is inactive, the transparent light-carrying layer 102 appears substantially transparent, thus allowing the user 130 to view various features, colors, etc., of objects through the configurable transparent structure 100. In some examples, the transparent light-carrying layer 102 may be substantially transparent, but with a tint of some predetermined color.

When the at least one light source is active, the transparent light-carrying layer 102 may be configured to distribute the light from the light sources substantially evenly throughout the transparent light-carrying layer 102, or to distribute the light according to some other distribution or pattern, thus at least partially obscuring the otherwise transparent nature of the layer 102. The at least one light source may provide some level of white light in some examples, or some level of other wavelengths of light, such as from a red-green-blue (RGB) controllable light source. Accordingly, the light being provided to the user 130 may function as environmental lighting for the user 130 to allow the user 130 to perform a variety of tasks, such as reading, writing, and so on. In some examples in which the at least one light source may facilitate a plurality of apparent light sources from the perspective of the user 130, the at least one light source may provide environment lighting and/or an information display akin to a monitor that may present textual or graphical information to the user.

In some examples, the configurable transparent structure 100 may also include a switchable light extraction layer 104 positioned adjacent to, and/or in optical communication with, the transparent light-carrying layer 102, between the transparent light-carrying layer 102 and the user 130. In one example, the switchable light extraction layer 104 may be a film or other laminate in direct contact with the transparent light-carrying layer 102, and the switchable light extraction layer 104 may have a refractive index equal or substantially equal to a refractive index of the transparent light-carrying layer 102 to promote the transfer of photons from the transparent light-carrying layer 102 to the switchable light extraction layer 104. As discussed herein, when two layers have substantially equal refractive indexes it recognizes that manufacturing variations, material differences, thickness differences, imperfections and other minor differences between layers and the indexes thereof may exist but the intended result is nonetheless achieved.

In one embodiment, the switchable light extraction layer 104 may be a polymer dispersed liquid crystal (PDLC) film, which is a voltage-controllable film containing liquid crystals dispersed in a polymer material. When a predetermined voltage is applied across the switchable light extraction layer 104, such as by the control unit 120, the crystals of the switchable light extraction layer 104 may align to allow photons received from the transparent light-carrying layer 104 to pass substantially transparently through the switchable light extraction layer 104 to the user 130. Consequently, when the at least one light source of the transparent light-carrying layer 102 is inactive and the predetermined voltage is applied to the switchable light extraction layer 104, light may be passed directly (e.g., substantially unimpeded or unscattered) from the transparent light-carrying layer 102 through the switchable light extraction layer 104 to the user 130. This configuration may result in the configurable transparent structure 100 appearing substantially transparent to the user 130 by allowing light to pass through the configurable transparent structure 100 substantially unimpeded or unscattered to the user 130. If, instead, the at least one light source of the transparent light-carrying layer 102 is active and the predetermined voltage is applied to the switchable light extraction layer 104, the light from the at least one light source passes substantially unimpeded from the transparent light-carrying layer 102 through the switchable light extraction layer 104 to the user 130. This particular configuration may result in the configurable transparent structure 100 appearing as a strong light source, or as a display, depending on the nature of the at least one light source and the transparent light-carrying layer 102.

If, instead, less than the predetermined voltage is applied to the switchable light extraction layer 104, less than all of the crystals of the switchable light extraction layer 104 may not be aligned, resulting in some percentage of the photons received from the transparent light-carrying layer 102 to be scattered, resulting in a translucent or hazy appearance. In some examples, the amount of translucence or haziness may increase with a decrease in the applied voltage, possibly resulting in a substantially opaque appearance for low or zero applied voltages in some examples. The brightness of any hazy light produced may depend at least in part on the intensity of the light being passed from the transparent light-carrying layer 102, whether originating from the at least one light source or from another light source external to the configurable transparent structure 100.

Other forms of the switchable light extraction layer 104 aside from a PDLC film or laminate, such as suspended particle devices (SPDs) and electrochromic devices, that allow a controllable amount of light passing therethrough to be scattered, such as by way of a voltage, current, or other means, may be employed in other embodiments. In addition, to enhance the transparent nature of the overall configurable transparent structure 100, substantially transparent electrodes, such as indium tin oxide (ITO) electrodes, which are transparent and colorless when employed in layers, may be used to couple the control unit 120 to control the switchable light extraction layer 104.

As shown in FIG. 1, a switchable mirror layer 106 may be positioned adjacent to, and/or in optical communication with, a side of the transparent light-carrying layer 102 opposite the user 130. In one example, the switchable mirror layer 106 may be controlled by a voltage provided by the control unit 120 to exhibit either a mirror state (during which light incident upon the switchable mirror layer 106 is reflected by the switchable mirror layer 106) or a transparent state (during which light incident upon the switchable mirror layer 106 is passed substantially unchanged therethrough). In some examples, a low or zero voltage applied across the switchable mirror layer 106 may place the switchable mirror layer 106 in the mirror state, while some predetermined voltage may place the switchable mirror layer 106 in the transparent state. Also, in some embodiments, voltage between zero and the predetermined voltage may place the switchable mirror layer 106 in a partially transparent, partially reflective state. In yet other examples, other voltages may be used to place the switchable mirror layer 106 in the mirror state or the transparent state. In some implementations, the switchable mirror layer 106 may be implemented using transition-metal switchable mirrors or other devices that are controllable by way of a voltage, current, or other aspect to attain the various states described above.

Given these possible states, the switchable mirror layer 106 may be employed in its mirror state to reflect light from the at least one light source of the transparent light-carrying layer 102 that exits the side of the transparent light-carrying layer 102 opposite the user 130 and reflect that light back to the transparent light-carrying layer 102 to increase the amount of light received by the user 130. The mirror state may also be effective in providing a level of privacy by reflecting light incident upon the switchable mirror layer 106 on the side opposite the user 130. Further, the transparent state of the switchable mirror layer 106 may be employed to allow light received from a side opposite the user 130 to pass therethrough substantially unchanged when the configurable transparent structure 100 is configured in a transparent state.

As also illustrated in FIG. 1, additional transparent layers 108 and 110, such as glass, plexiglass, or the like, may be used to protect the switchable light extraction layer 104 and the switchable mirror layer 106 from dirt, scratches, and other maladies. In yet other examples, additional transparent layers (not explicitly shown in FIG. 1) may be placed between the transparent light-carrying layer 102 and the switchable light extraction layer 104, and/or between the transparent light-carrying layer 102 and the switchable mirror layer 106. Other configurations are also possible while maintaining the relative position of the transparent light-carrying layer 102, the switchable light extraction layer 104, and the switchable mirror layer 106.

Figure 2A:
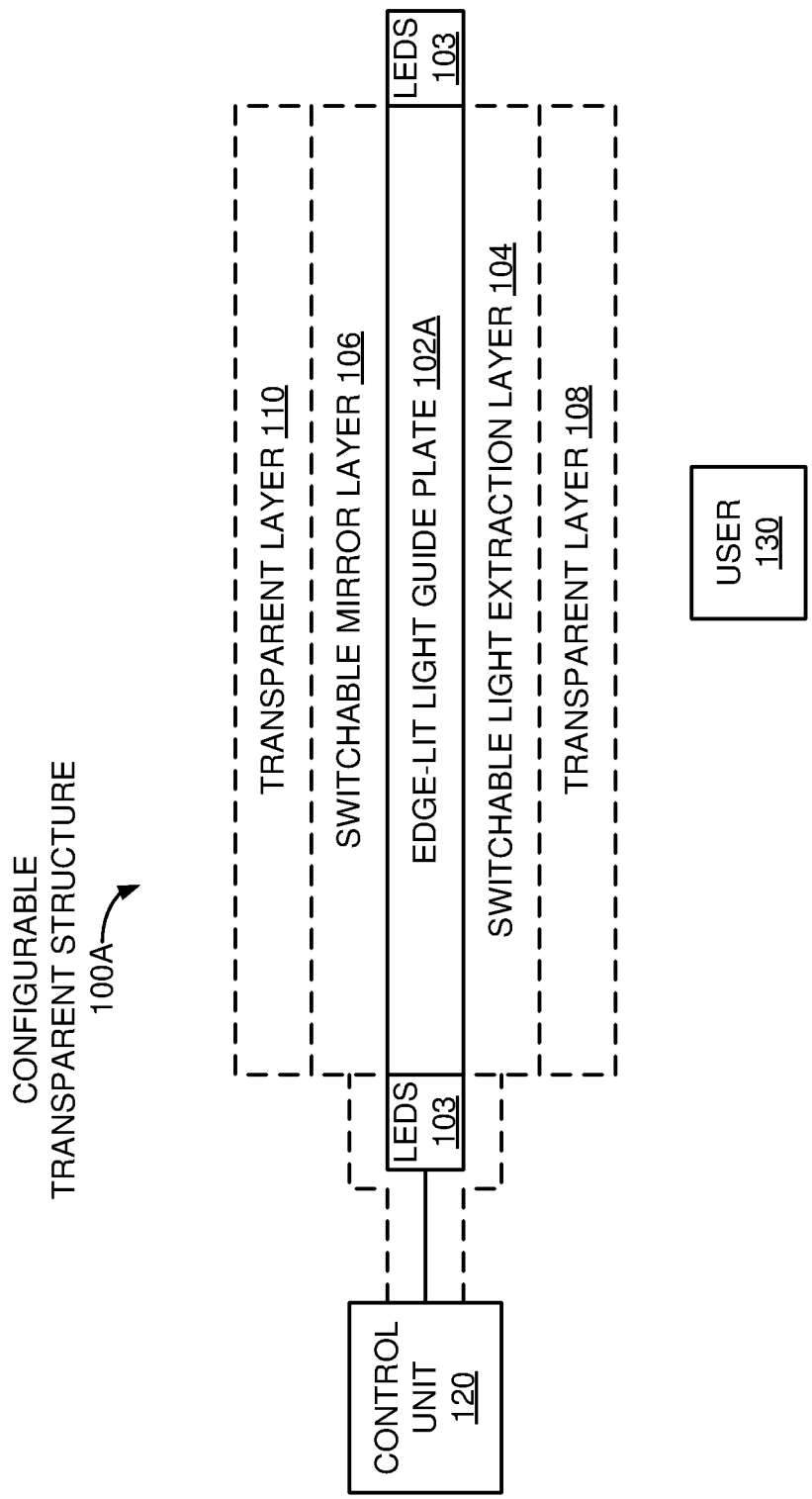
FIG. 2A is a side-view representation of an example configurable transparent structure for lighting and/or display that employs an edge-lit light guide plate.

FIG. 2A is a side-view representation of an example configurable transparent structure 100A for lighting and/or display that employs an edge-lit light guide plate (LGP) 102A as the transparent light-carrying layer 102 of FIG. 1. As shown, the edge-lit LGP 102A is adjacent or optically coupled to one or more LEDs 103, such as along one or more edges of the edge-lit LGP 102A. The edge-lit LGP 102A may possess a refractive index that is much different than that of air to facilitate near-total internal reflection of the light provided by the LEDs 103 within the edge-lit LGP 102A.

In addition, the edge-lit LGP 102A may incorporate one or more features that aid in directing at least some of the light toward the user 130. One example of such a feature may be surface patterning, in which grooves or other structures may be cut or otherwise formed into the surface of the edge-lit LGP 102A facing the user 130. Such patterning may facilitate the emission of at least some light incident at the patterning from the edge-lit LGP 102A toward the user 130. Volume patterning of the edge-lit LGP 102A may also be employed in addition to, or in lieu of, surface patterning to provide similar results. Another example feature may be a diffuse material residing within the edge-lit LGP 102A that may have a different refractive index than that of the edge-lit LGP 102A, thus possibly redirecting at least some of the light toward the user 130. In some cases, the concentration of the diffuse material may be different within different areas of the edge-lit LGP 102A to facilitate a relatively even dispersion of light along the surface of the edge-lit LGP 102A toward the user 130. In another example, the surface of the edge-lit LGP 102A facing the user 130 may be cut with a laser to produce near-invisible defects that disperse light in one or directions. In some examples, the one or more features being implemented in the edge-lit LGP 102A may disperse light both toward and away from the user 130, thus informing the potential use of the switchable mirror 106, as described above, to redirect light being emitted away from the user 130 back toward the user 130 through the edge-lit LGP 102A. Other types of features not specifically described herein may be generated either within the volume of the edge-lit LGP 102A (e.g., by way of laser volume engraving, refractive index changes, or use of guest-host structures) or on the surface of the edge-lit LGP 102A (e.g., by way of macroscopic patterning, micro-patterning, nano-patterning, surface roughening, laser surface etching, or chemical surface etching) to direct at least some of the light from the LEDs 103 toward the user in other implementations.

In conjunction with the edge-lit LGP 102A, the switchable light extraction layer 104 may be patterned so that different levels of light extraction from the edge-lit LGP 102A, may be performed in different areas of the configurable transparent structure 100A. Such patterning may be static by way of the particular structure of the switchable light extraction layer 104 to create different amounts of extraction, or may be more dynamic by creating different controllable or addressable areas of the switchable light extraction layer 104, each of which may provide a different level of extraction. Such examples are described in greater detail below in conjunction with FIGS. 4, 5A, and 5B.

In some examples, the edge-lit LGP 102A may be operated in conjunction with the switchable light extraction layer 104 such that the LEDs 103 are off while the switchable light extraction layer 104 is set to its transparent state to allow light to pass through the configurable transparent structure 100A in a transparent manner to the user 130. In another example, the switchable extraction layer 104 may be set to a more translucent state while the LEDs 103 are off to soften or partially block light passing through the configurable transparent structure 100A toward the user, such as to soften or block intense sunlight. In other examples, the LEDs 103 may be active to provide light to the user 130. In that case, the switchable light extraction layer 104 may be set to its transparent state to provide more intense task lighting, or the switchable light extraction layer 104 may be set to a more translucent state to provide a softer, more diffuse lighting.

Figure 2B:
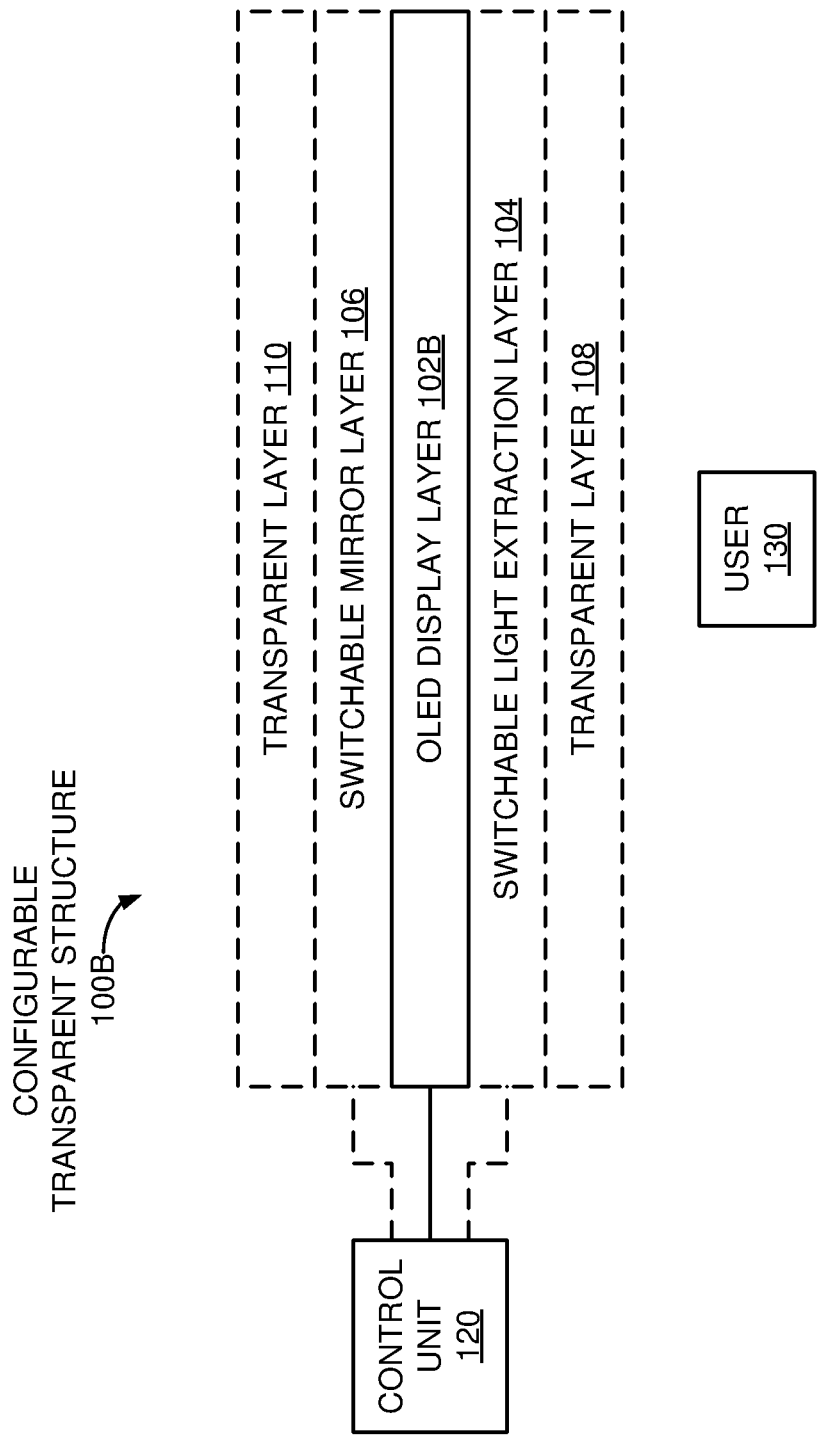
FIG. 2B is a side-view representation of an example configurable transparent structure for lighting and/or display that employs an organic light-emitting diode (OLED) display layer.

FIG. 2B is a side-view representation of an example configurable transparent structure 100B for lighting and/or display that employs an organic light-emitting diode (OLED) display layer 102B as the transparent light producing layer 102 of FIG. 1. The OLED display layer 102B may include multiple OLEDs in a particular pattern or array within a pane or section of transparent media, such as glass, plexiglass, or the like, with each OLED or group of OLEDs being assigned to illuminate a particular area of the OLED display layer 102B. Each of the OLEDs may also be individually addressable, and may be white, red, green, or blue in color to provide general lighting and/or display functionality. In one example, the OLEDs may exhibit a low fill factor, such that the area of the OLED display layer 102B, as viewed by the user 130, that is consumed by the OLEDs is much less than a particular area of the OLED display layer 102B associated with that OLED, which may be considered a pixel. In another example, the OLEDs may be transparent OLEDs (TOLEDs), which are generally transparent in nature from the viewpoint of the user 130. Other types of OLEDs or LEDs may be employed in other examples to facilitate use of the configurable transparent structure 100B as a light source or informational display while retaining a substantially transparent nature for the transparent light-carrying layer 102 while the LEDs are inactive.

Figure 2C:
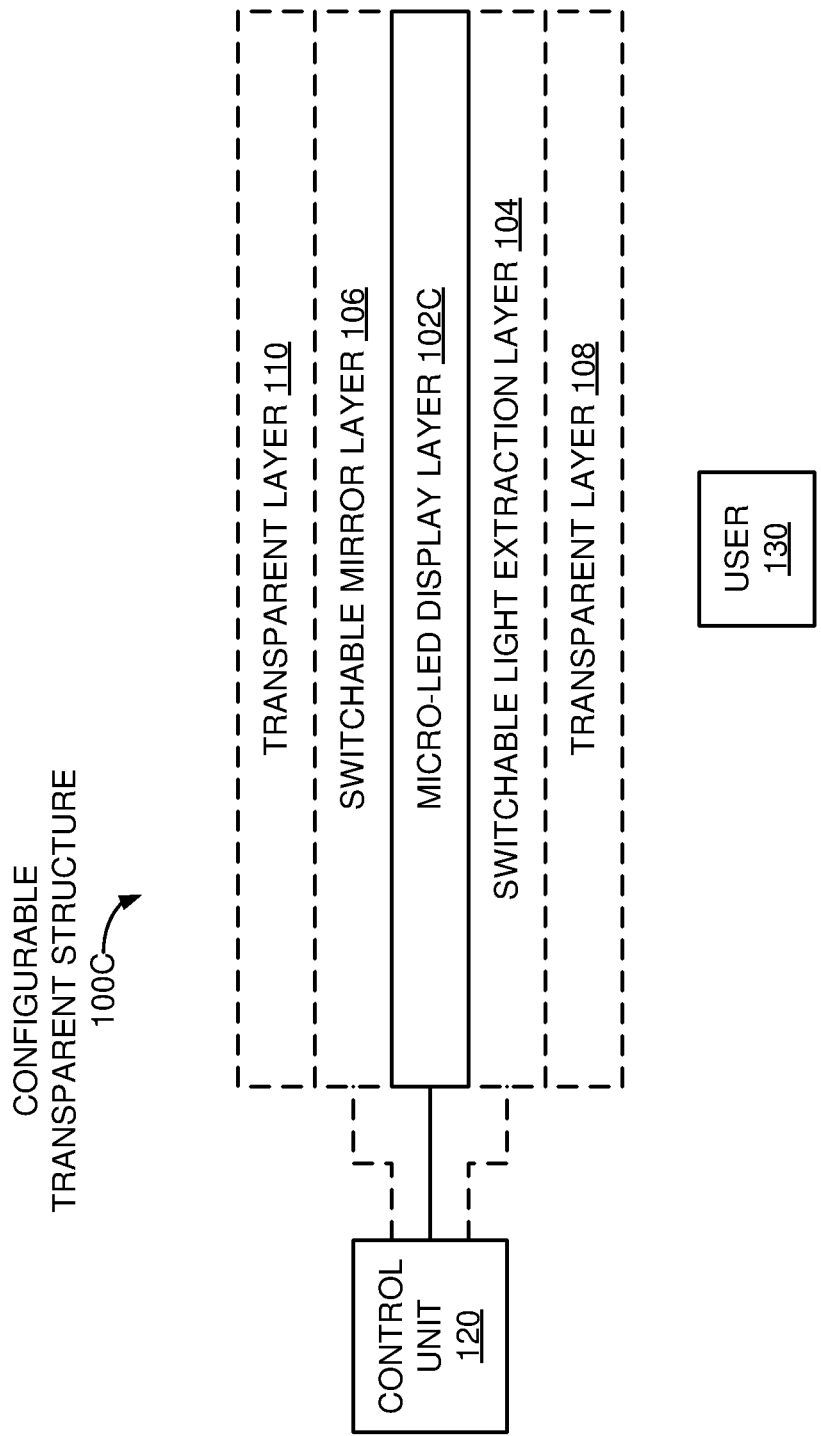
FIG. 2C is a side-view representation of an example configurable transparent structure for lighting and/or display that employs a micro-light-emitting diode (micro-LED) display layer.

FIG. 2C is a side-view representation of an example configurable transparent structure 100C for lighting and/or display that employs a micro-light-emitting-diode (micro-LED) display layer 102C as the transparent light-carrying layer 102 of FIG. 1. Similar to the OLEDs of the OLED display layer 102B of FIG. 2B, the micro-LED display layer 102C may include multiple micro-LEDs in a pattern or array within a section of transparent media, such as glass, plexiglass, or the like, with each micro-LED or group of micro-LEDs being assigned to illuminate a particular area of the micro-LED display layer 102C. Each of the micro-LEDs may also be individually addressable, and may be white, red, green, or blue in color to provide general lighting and/or display functionality. Moreover, the micro-LEDs may exhibit a low fill factor due to their small size, such that the area of the micro-LED display layer 102C, as viewed by the user 130, that is consumed by the micro-LEDs is much less than a particular area of the micro-LED display layer 102C associated with that micro-LED, such as a pixel. Other types of small light sources, such as nano-LEDs, may be employed in a transparent layer in a similar manner.

The display layer 102B and 102C, in addition to providing general or focused lighting, may be employed as a display that may provide static and/or dynamic information, including, but not limited to, textual information (e.g., reading material, driving directions, etc.), graphical information (e.g., maps, decorative graphics, star field displays, and so on), video information, and the like.

In addition, or as an alternative, to the use of micro-LEDS as light sources and/or display elements within the micro-LED display layer 102C, a plurality of micro-LEDs may be located within or upon a surface of the micro-LED display layer 102C sparsely to simulate a starry night sky. In such embodiments, the micro-LEDs need not be arranged in any kind of array or other formal arrangement, but may instead be more randomly and sparsely situated within or alongside the micro-LED display layer 102C. The micro-LEDs may also be controlled as a group or more individually, possibly with varying light intensity to provide a twinkling effect. Further, the micro-LEDs may be active while the switchable light extraction layer 108, if employed, is in a transparent or translucent state.

Figure 3:
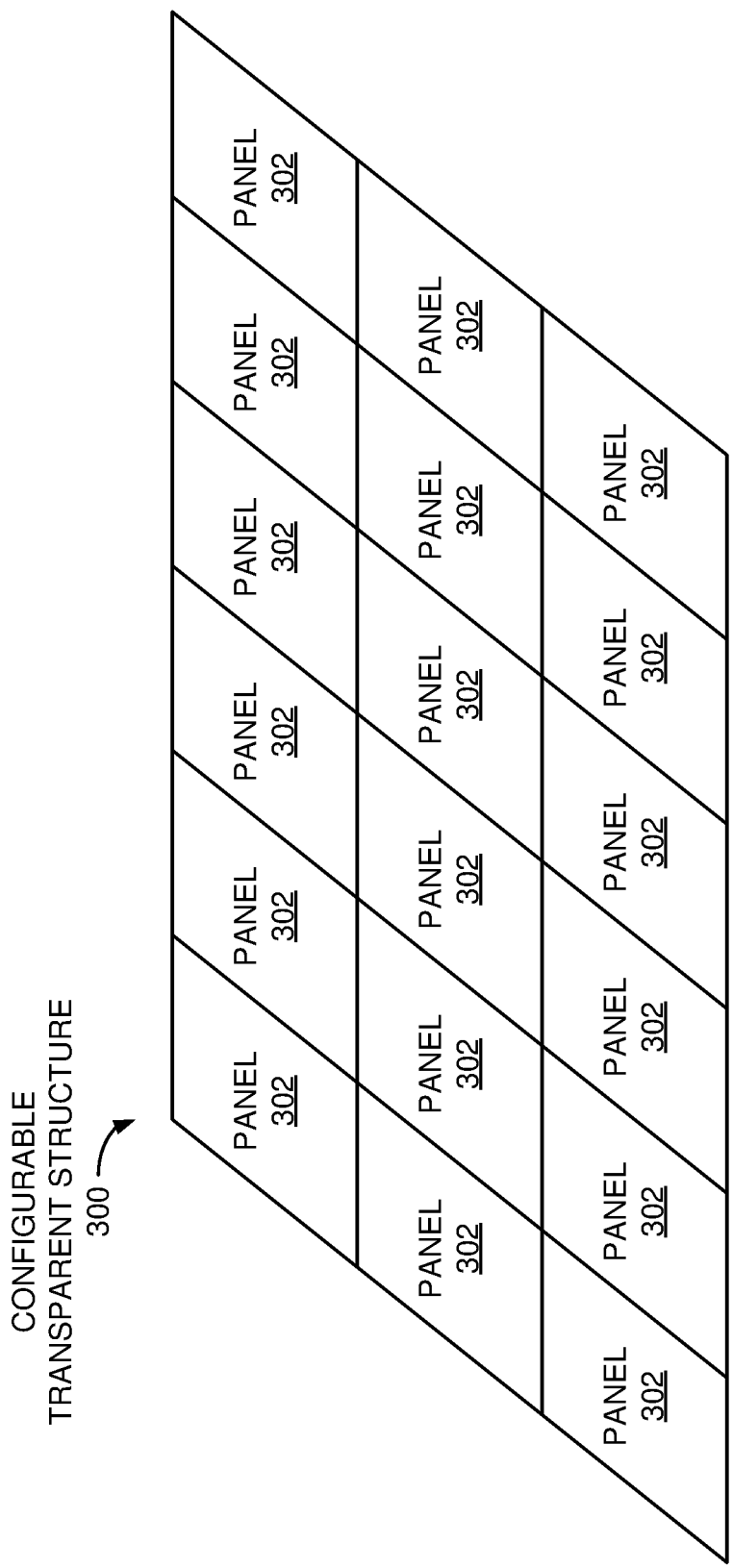
FIG. 3 is an isometric-view representation of an example configurable transparent structure for lighting and/or display that includes multiple, individually controllable panels.

FIG. 3 is a perspective-view representation of an example configurable transparent structure 300 for lighting and/or display that includes multiple, individually controllable panels 302. Each panel 302 may be operated as an individual configurable transparent structure 100, such as those described above with respect to FIGS. 1, 2A, 2B, and 2C, with each panel 302 having its own separately addressable or controllable transparent light-carrying layer 102, switchable light extraction layer 104, and/or switchable mirror layer 106. Further, diverse types of the layers 102, 104, and/or 106 may be employed among the panels 302. For example, some panels 302 may include an edge-lit LGP 102A may be used for focused task lighting or general lighting, while other panels 302 of the same configurable transparent structure 300 may include OLED display layer 102B or a micro-LED display layer 103B to provide relatively high-resolution display functionality, possibly in addition to lighting functionality.

Figure 4:
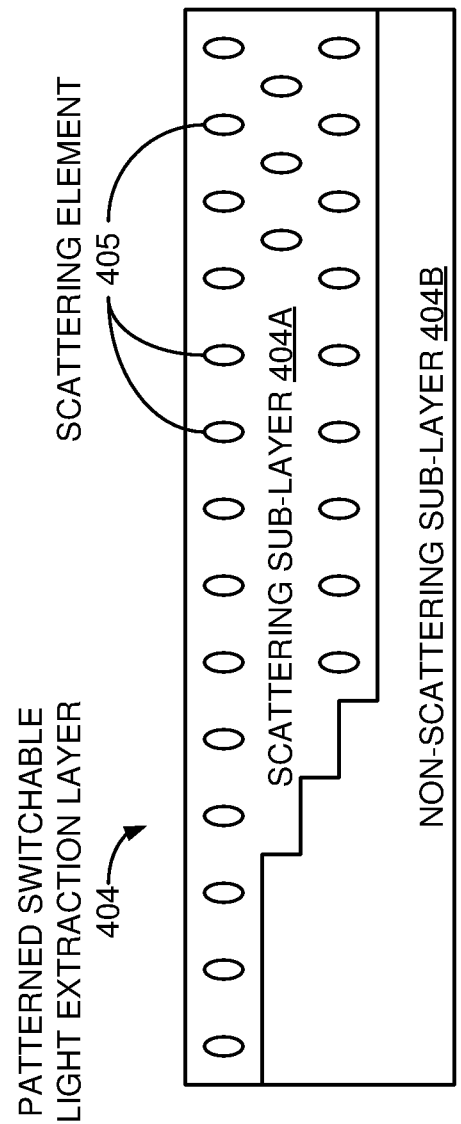
FIG. 4 is a side-view representation of an example patterned switchable light extraction layer that may be used in the example configurable transparent structures disclosed herein.

FIG. 4 is a side-view representation of an example patterned switchable light extraction layer 404 that may be used in the example configurable transparent structures 100 disclosed above. This particular example provides a static pattern in which different areas of the patterned switchable light extraction layer 404, from the viewpoint of the user 130, provide different thickness through which scattering elements 405, such as the liquid crystals of a PDLC film or layer, may be aligned or unaligned, thus causing differing levels of light scattering, and thus translucence or haziness, from one area to the next.

Figure 5A:
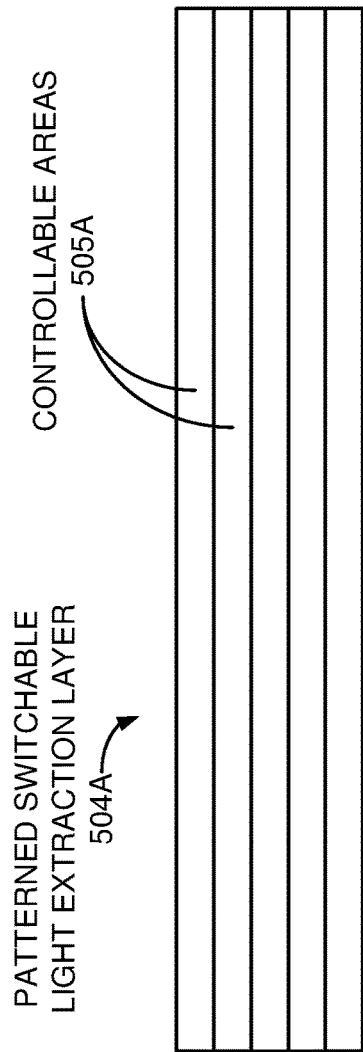
FIGS. 5A and 5B are top-view representations of example patterned switchable light extraction layers having multiple, individually controllable areas.
Figure 5B:
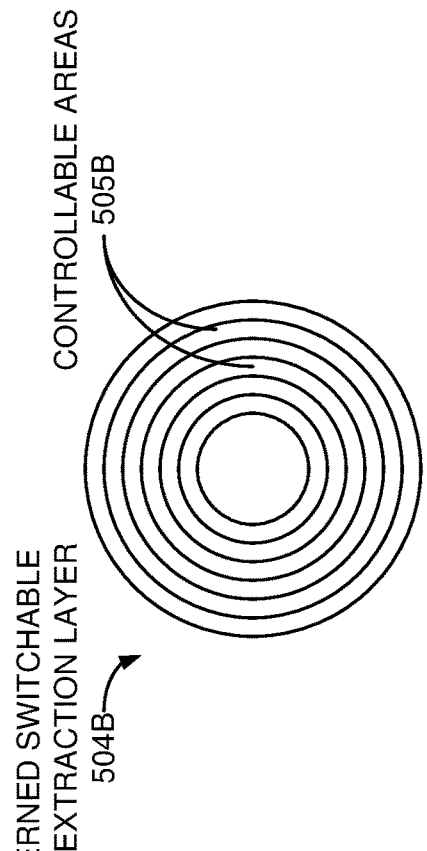

FIGS. 5A and 5B are top-view representations of example patterned switchable light extraction layers 504A and 504B having multiple, individually controllable or addressable areas. More specifically, FIG. 5A provides a plurality of rectangular-shaped controllable areas 505A, with each controllable area 505A possibly being controlled with separate sets of electrodes driven by the control unit 120. FIG. 5B provides a set of concentric, annular controllable areas 505B that may be individually controlled in a similar manner. Other shapes and configurations for the patterned switchable light extraction layer 504A and 504B are also possible in other examples. In each case, each separately controllable area 505A and 505B may be placed in a transparent, translucent, and/or opaque state individually, thus providing hazy or filtered light in some areas, more focused task lighting in other areas, and so forth.

Figure 6:
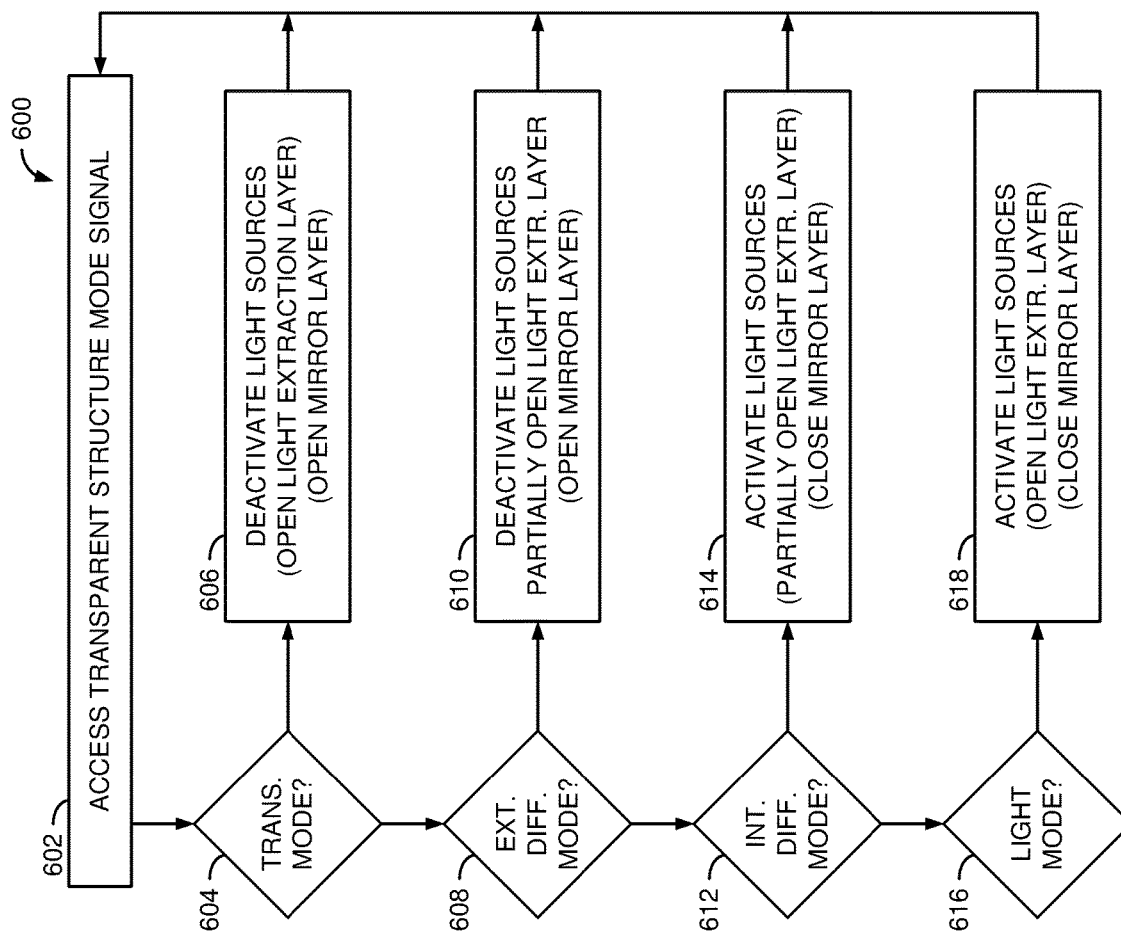
FIG. 6 is a flow diagram of an example method of operating the configurable transparent structure of FIG. 1.

FIG. 6 is a flow diagram of an example method 600 of operating the configurable transparent structure 100 of FIG. 1, as well as other configurable transparent structures disclosed herein. In some examples, the control unit 120 of FIGS. 1 and 2A through 2C may be perform one or more of the operations of the method 600, or cause one or more of the operations to be performed. However, other structures not specifically described herein may be perform these operations, or cause them to be performed. Also, while the method 600 of FIG. 6 indicates that each operation therein is performed in a particular order of execution, the operations may be performed in a different order than that explicitly shown.

In the method 600, a transparent structure mode signal is accessed (operation 602). For example, the control unit 120 may generate such a signal in response to input received from the user 130 via one or more input devices (e.g., voice commands provided via microphone, gesture commands via camera, touch input via buttons, and touch input via capacitive touch layers incorporated into the configurable transparent structure 100). For example, the user 130 may touch a particular panel 302 of the configurable transparent structure 300 to cause that panel 302 to operate in a particular state. In some embodiments, such input may be provided by way of a third device, such as a cell phone or tablet computer. Other information, such as preferences of the user 130 (e.g., sleep/awake cycles of the user 130, preferred light levels and so on), identification of the user 130 (e.g., by way of facial recognition or other means), and environmental information (e.g., current light levels or current audio levels within the environment in which the configurable transparent structure 100 is located, such as within or outside a vehicle, detection of potential hazards or obstacles relative to a vehicle) may also be considered in the generation of the signal.

Based on the signal, a particular mode of operation for the configurable transparent structure 100 may be set. For example, if the signal indicates that the configurable transparent structure 100 is to be placed in a transparent mode (operation 604), the one or more lights sources of the transparent light-carrying layer 102 may be deactivated (e.g., turned off), and the switchable light-carrying layer 104 and the switchable mirror layer 106, if present, may be placed in the transparent or "open" state (operation 606) to allow light to pass through the configurable transparent structure 100 to the user 130.

If, instead, the signal indicates that the configurable transparent structure 100 is to be placed in an external diffusion mode (operation 608), the one or more lights sources of the transparent light-carrying layer 102 may be deactivated, and the switchable light-carrying layer 104, if present, may be placed in a partially transparent or translucent state, or partially open mode, and the switchable mirror layer 106, if present, may be placed in the transparent or open state (operation 610). Use of such a mode may allow light passing through the configurable transparent structure 100 toward the user 130 to be at least partially diffused or scattered.

If the signal indicates that the configurable transparent structure 100 is to be placed in an internal diffusion mode (operation 612), the one or more lights sources of the transparent light-carrying layer 102 may be activated (e.g., turned on), the switchable light-carrying layer 104, if present, may be placed in a partially transparent or translucent state, and the switchable mirror layer 106, if present, may be placed in the mirror state (operation 614). In this mode, light from the transparent light-carrying layer 102, potentially reinforced by reflection of the light from the switchable mirror layer 106, may be at least partially diffused or scattered at the switchable light extraction layer 104 prior to reaching the user 130.

Based on the signal indicating instead that the configurable transparent structure 100 is to be placed in a display mode or a direct lighting mode (operation 616), the one or more lights sources of the transparent light-carrying layer 102 may be activated, the switchable light-carrying layer 104, if present, may be placed in a transparent or open state, and the switchable mirror layer 106, if present, may be placed in the mirror state (operation 618). Consequently, light from the transparent light-carrying layer 104, possibly reinforced by reflection of the light from the switchable mirror layer 106, may be presented to the user 130 in a substantially undiffused manner for general lighting, task lighting (e.g., as a spotlight), or for purposes of textual or graphical display as described above in conjunction with the OLED display layer 102B and the micro-LED display layer 102C of FIGS. 2B and 2C, respectively.

In some instances, an edge lit light guide structure as generally discussed with reference to various embodiments herein may be sensitive to surface smoothness and cleanliness. For example, dirt, fingerprints, minor scratches, and water on the outer surface of a structure can result in distortion or uneven light extraction at such locations and/or at the boundaries to such locations.

Figure 7A:
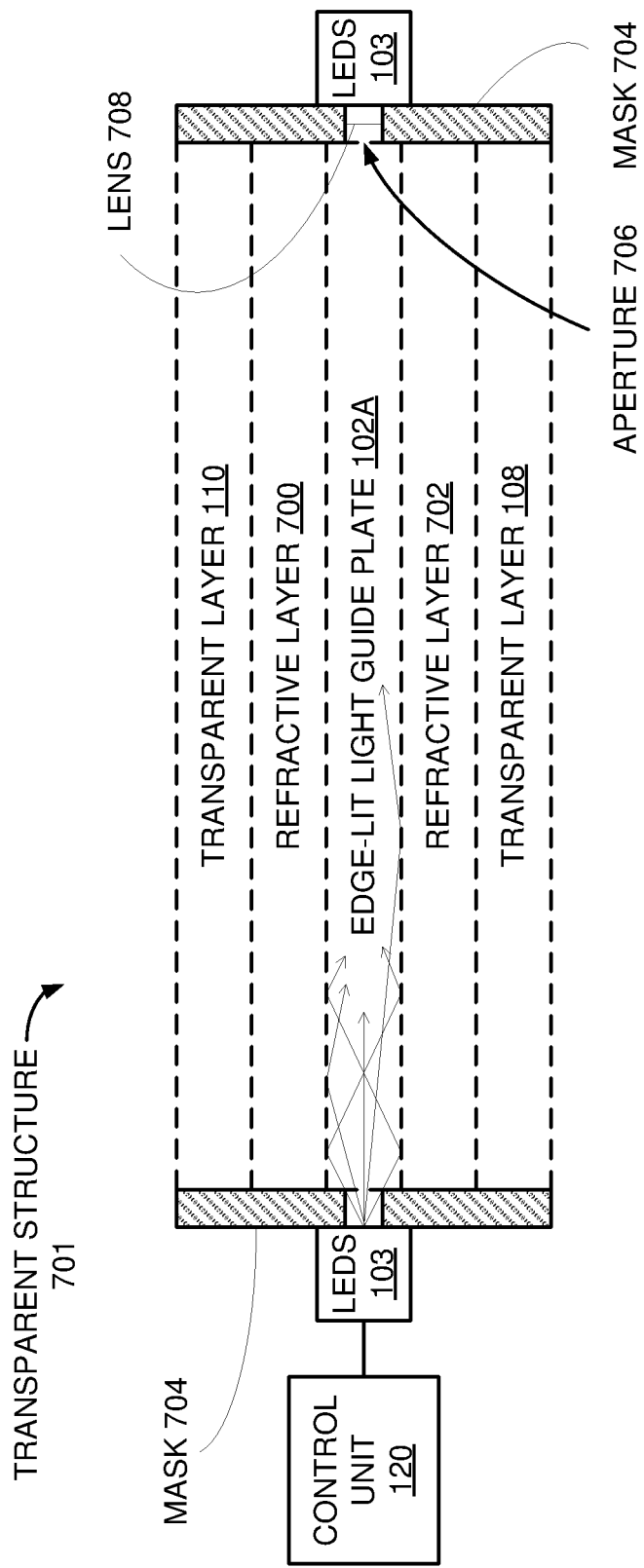
FIG. 7A illustrates a side-view representation of a structure, which may be substantially transparent, having a light source coupled into a light guide layer through an aperture defined in a mask whereby the aperture allows light into the plate at an acceptance angle such that light stays within the plate.

FIG. 7A is a side section view of an example of a transparent structure 701 with a controllable edge lit light guide structure. The transparent structure may include a control unit 120 and one or more light sources, such as LEDS 103, discussed with respect to other embodiments herein. In this example, however, a mask 704 is positioned between the light source and the light guide plate. The mask includes at least one aperture 706 that allows light to pass from the light source into the light guide plate. The mask and aperture may be considered a form of optical guide. Generally speaking, the optical guide assists in coupling light from the light source into the light guide structure in a way that light is maintained within the light guide structure under principles of total internal reflection. It should be recognized that some light may nonetheless escape, and there may be instances where the optical guide is configured in way such that some photons from the light source exit the light guide structure. Moreover, as discussed herein, the light guide structure may be configured to scatter some light or otherwise not maintain all light within the light guide structure. The light guide plate, in this example, is sandwiched between refractive layers (700, 702) such that the index of refraction for the light guide plate is greater than the refractive layers. In one specific example, the light guide plate may be acrylic with an index of refraction at about 1.49 and the refractive layers may be polyvinyl butyral (PVB) with an index of refraction of about 1.45. The combined structure forms a light guide through the light guide plate where photons from the light source intersecting the light guide plate/refractive layer boundary are partially or completely guided through the light guide layer pursuant to principles of total internal reflection, which is illustrated by the rays exiting the light source and reflecting from the upper and lower refractive layers (700, 702) and otherwise staying within the light guide plate. In an embodiment with one or more opposing light sources (on the opposite side of the plate and as shown) similar light would emit into the plate through the corresponding aperture or apertures as the case may be.

The aperture size and configuration, defined in the mask 704, will depend on the light source, the separation between the light source and the aperture 706 and the light guide, the thickness of the light guide, the index of refraction of light guide plate 102 and the refraction layers, and/or other factors. A numerical aperture computation may be used to define the aperture size for any specific arrangement of light source, light guide and refractive layers. Stated differently, the aperture may be defined such that light rays emanating from the source are at an acceptance angle, cone or otherwise, into the light guide plate such that light from the source is retained, substantially, within the light guide plate. The optical guide, and the aperture portion in particular is intended to limit or otherwise reduce the volume of light entering the light guide structure to minimize or otherwise eliminate light that intersects the light guide/refractive layer boundaries at greater than the critical angle allowing light to escape from the light guide into other layers and thereby be enhanced or otherwise interact with any defects or surface imperfection on the outer layers, e.g. the outer transparent layers of FIG. 7A.

In an alternative to a mask or complementing a mask, light may be focused into the light guide structure using a lens 708 to focus light on the light guide plate or optical fibers coupling the light source into the light guide as well as other configurations. Depending on the light configuration, there may be lens for individual light sources or for groups of light sources. Similarly, a fiber may couple light into the light guide from one or a plurality of light sources.

Figure 7D:
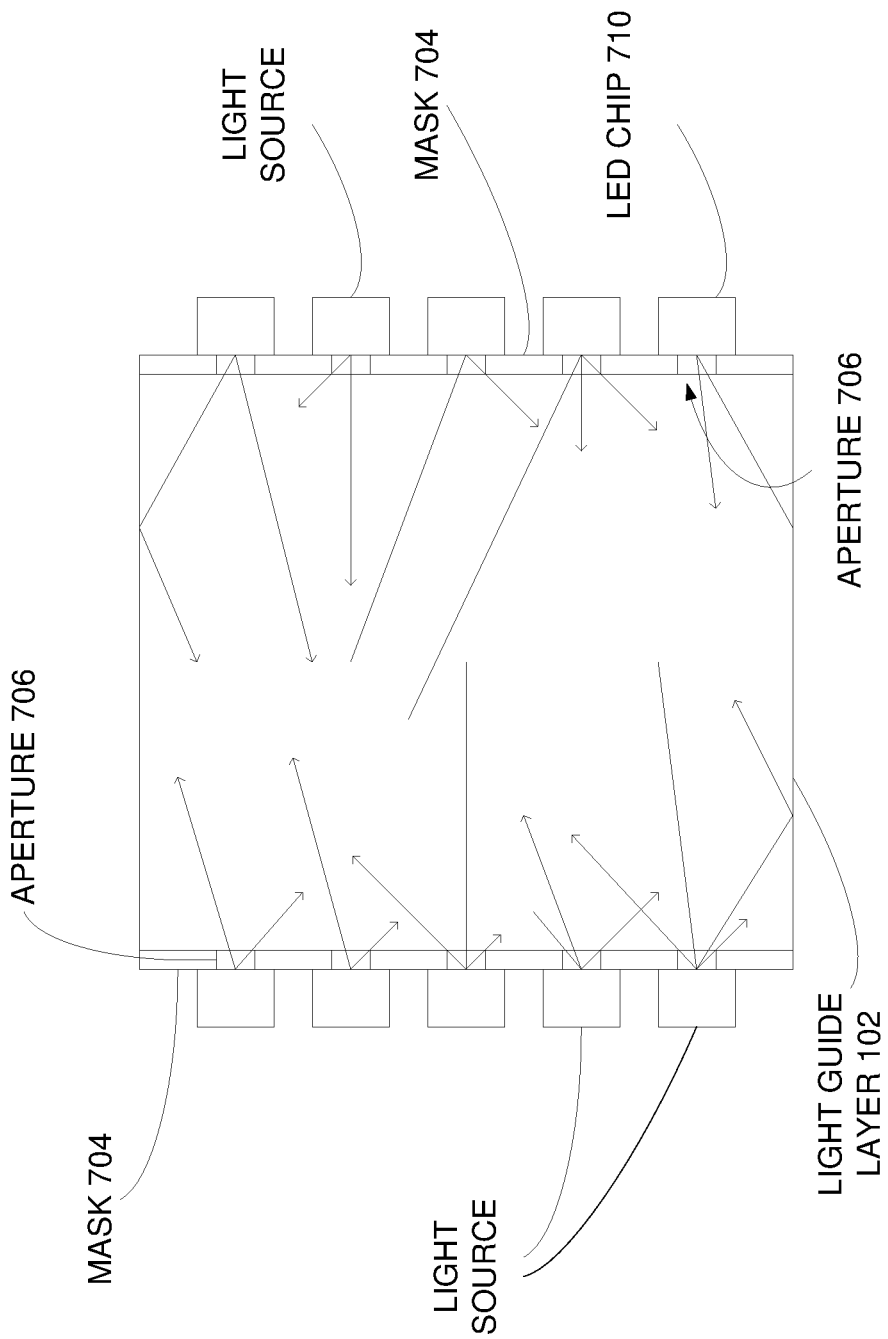
FIG. 7D is a top section-view representation of the structure of FIG. 7A.

FIG. 7B is a front view of the transparent structure of FIG. 7A, particularly illustrating the mask and associated apertures 706 restricting the light and angle of light passing from the light sources into the plate. FIG. 7D is a top section view through the light guide layer and illustrating the relationship between the mask, apertures and light sources in one configuration. The light sources, in the case of LEDS, may be discrete LED chips 710 mounted on a printed circuit board and spaced to position the emissions from the LEDs in line with the various respective apertures.

The mask may be formed from black tape or other opaque tapes, a plastic or other molded or formed piece with the appropriate apertures defined therein, as well as other structures. In the side view of FIG. 7A, the mask is illustrated as extending across the height of the layers for the structure. In such a configuration, the mask blocks light from the light source, or other sources, from entering the sides of the transparent structure other than at the apertures defined in the mask and aligned with the respective light sources. The mask, however, may be sized differently and may only be positioned to block light from the light source in other ways. Additionally, the apertures are illustrated as discrete apertures relative to each LED. It is possible, however, to provide an elongate slit like aperture 702 (see FIG. 7C extending between the various light sources thereby prohibiting allowing a wide angle of light to enter the light guide across its width but blocking a range of upper and lower angles from entering the light guide vertically. For example, the slit aperture may allow 180 degrees of light into the light guide across its width but only allow a narrow angular vertical range of light into the height of the light guide and at the appropriate acceptance angle such that light fills the width of the light guide but is retained with the light guide and does not pass into the outer layers.

Figure 8A:
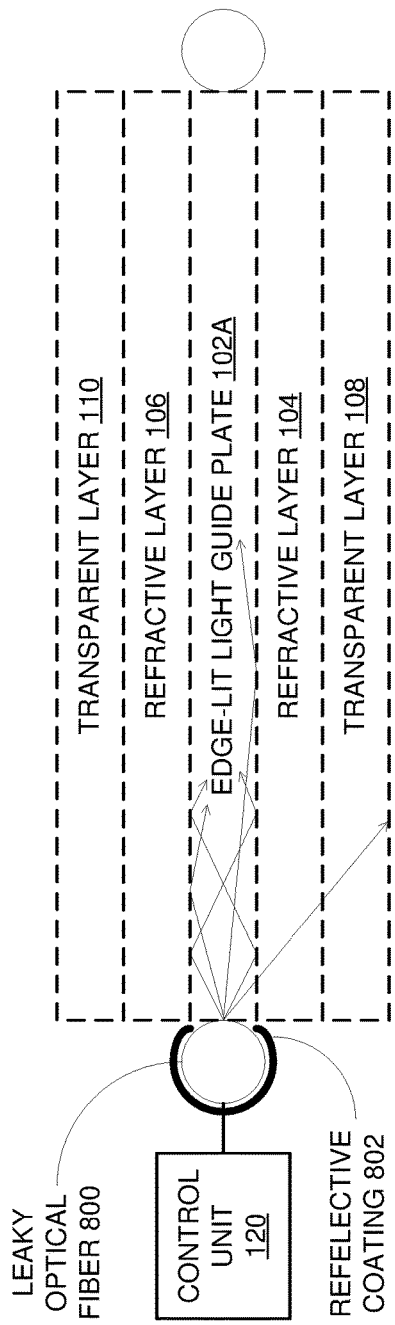
FIG. 8A is a side-view representation of a structure, which may be a substantially transparent layered structure, with a leaky optical fiber placed along an edge of a light guide plate to couple light into the plate.
Figure 8B:
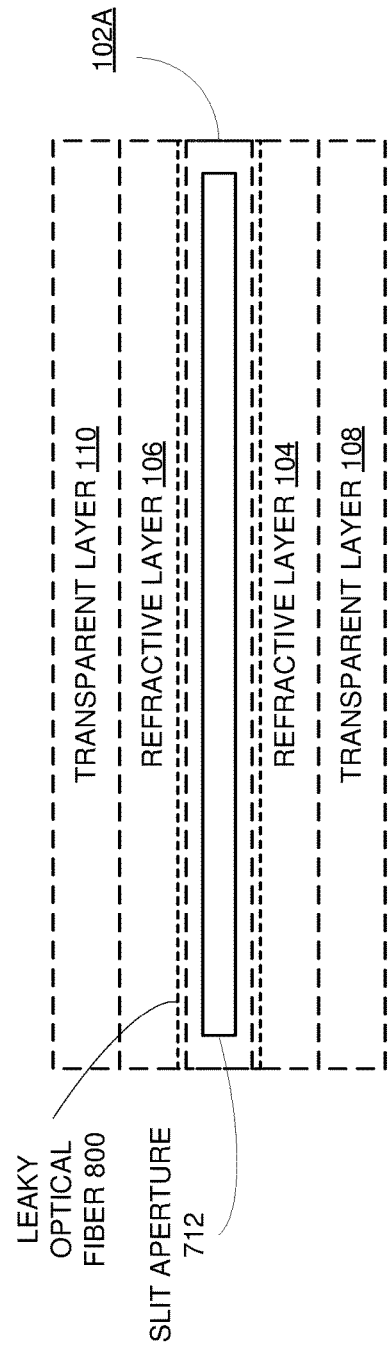
FIG. 8B is a front section view representation of the structure of FIG. 8A but with the leaky optical fiber positioned along a slit aperture in a mask between the fiber and an edge of the light guide plate.

FIGS. 8A and 8B are side section views and front views, respectively, of a transparent structure having a light tube 800, such as a fiber optic section as the light source. In this example structure, the layer arrangement is as shown and described relative to FIG. 7A. However, the light source is a fiber option section, which is "leaky" such that light is emitted from the sides of the fiber. A fiber section may surround the edge lit light guide, or positioned along any number of possible sides. For example, as shown in FIG. 8A, there are fibers to either side of the light guide plate. In a rectangular plate, fibers may be on all four sides or some combination of sides. Further, as illustrated with one of the fiber sections, a reflective coating 802 may be placed along the optical cladding of a portion of the fiber such that photons leaking from the fiber are leaking into the plate and the opposing side, away from the plate, reflects photons such that they are retained in the fiber to then emit into the plate. Alternatively or in addition, as shown in FIG. 8B, a mask with a slit aperture 712 may be provided between the fiber and one or more edges of the guide plate. The slit aperture defining an acceptance angle of light passing into the light guide plate from the fiber.

Figure 9:
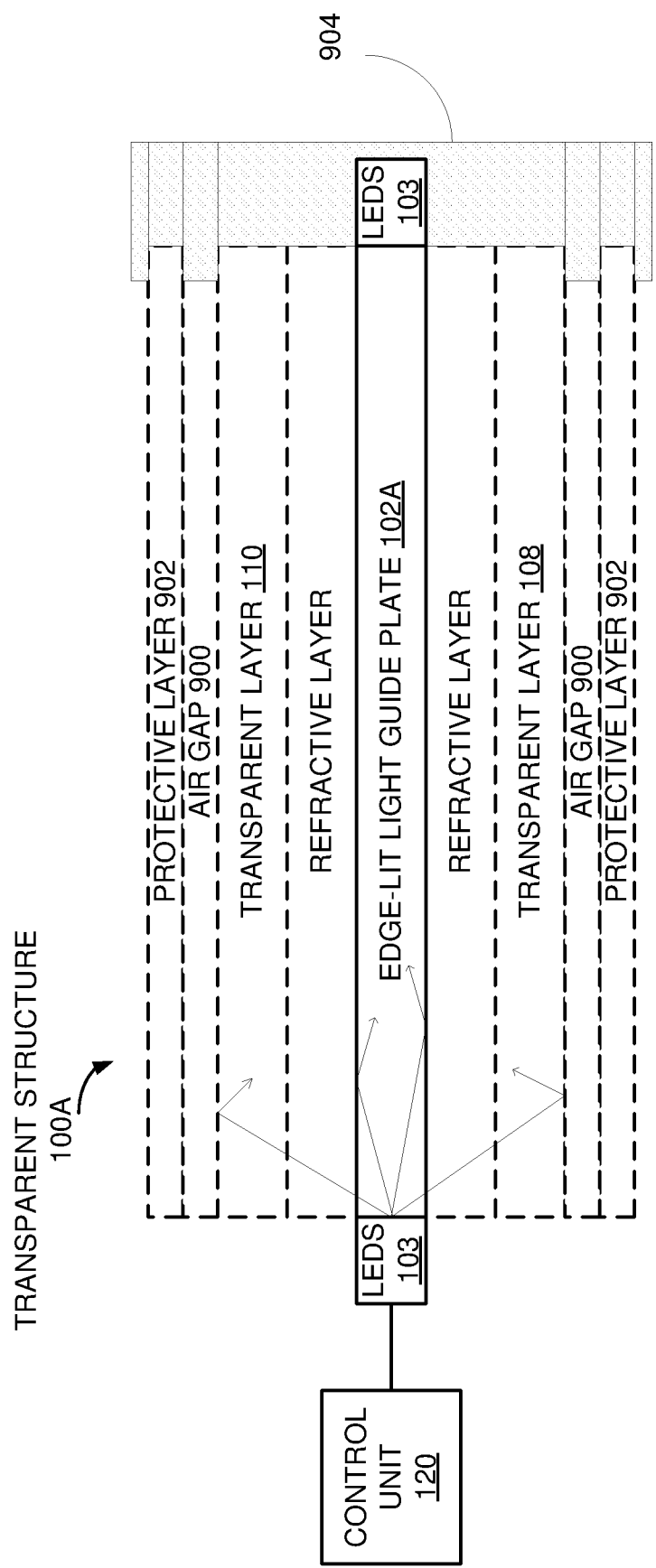
FIG. 9 is a side-view representation of a transparent structure with an edge-lit light guide bounded various layers and including outer air gap layers bounded by protective layers, where the air gap layers provide an overall light guide structure to the layers therebetween.

FIG. 9 is another alternative transparent structure. In contrast to other embodiments, the edge lit light guide plate is bounded by air gaps 900 that separate the plate from transparent layers. The transparent layer, may, for example, be glass with an index of refraction of about 1.5. The structure of FIG. 9 is configured to retain light within the light guide plate 102A and minimize the amount of light bleed into the transparent structures by providing the high index of refraction from air. Accordingly, to the outside of either or both of the upper and lower transparent layers, only scattered light is diffused relatively evenly into the transparent layers. Air has an index of refraction of about 1. The light guide plate, in contrast, has index of refraction of about 1.4. Thus, the air boundary will reflect a great deal of light incident on the plate/air boundary back into the light guide structure. If used in conjunction with a mask, lens or the like, further tailoring of the light retained in the edge lit light guide structure may be achieved.

To provide an air gap, the transparent structure may be supported in side rails or some other form of framework. A cross section of a portion of the support framework is illustrated on one side of the diagram. In the example illustrated, the transparent layers (e.g., glass plates) are supported at distance above and below the light guide plate, respectively, with the distances above and below providing the air gap. Protective layers 902 may further be provided above, and below, the air gap to form a gap between the respective protective layer and the respective transparent layer 108.

Figure 10:
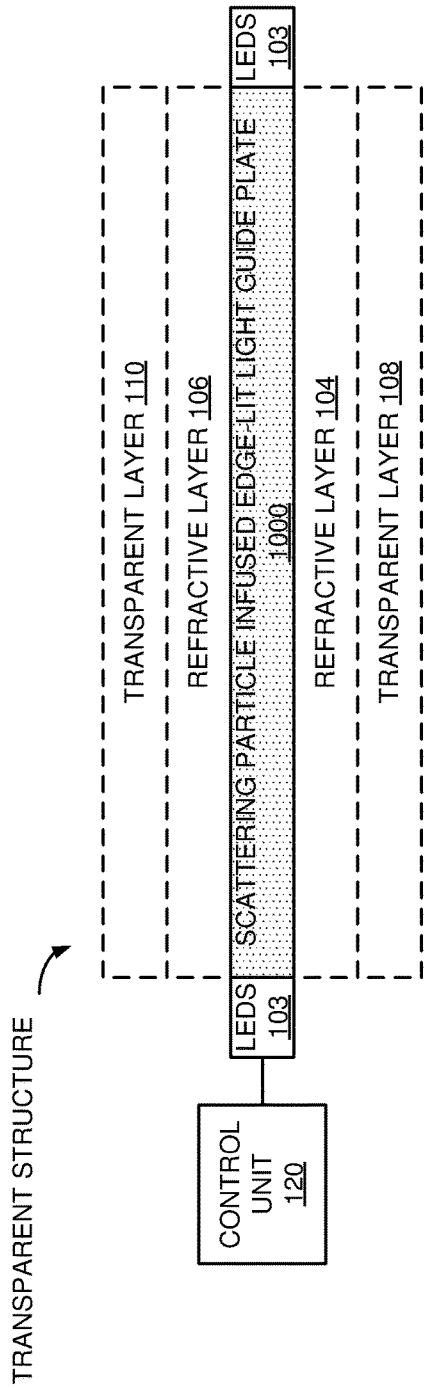
FIG. 10 is a side-view representation of a transparent structure having an infused edge-lit light guide plate.
Figure 11:
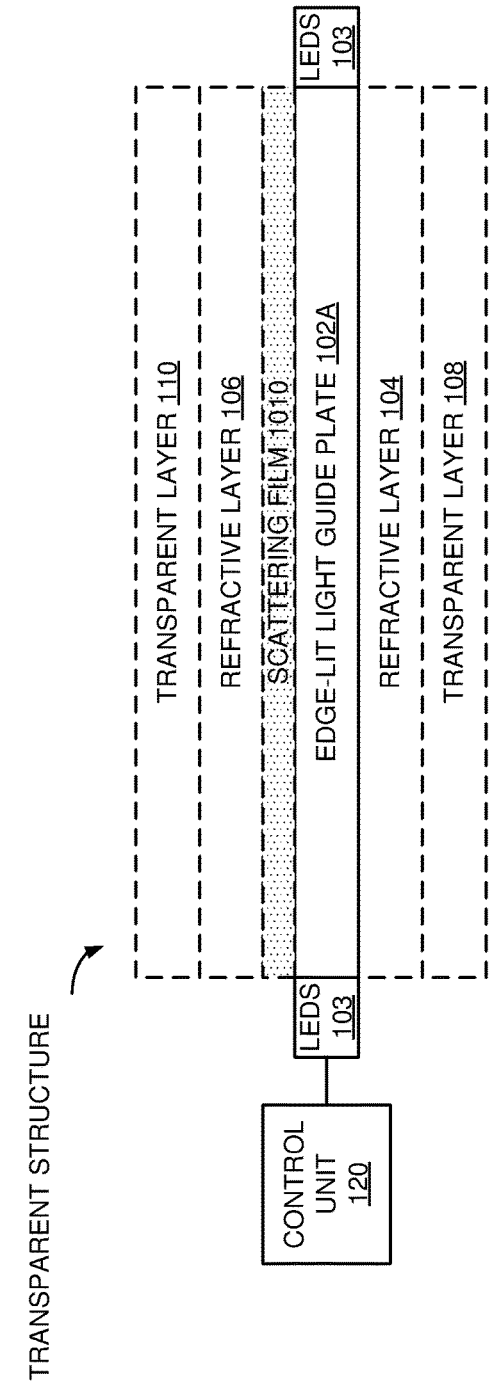
FIG. 11 is a side-view representation of a transparent structure having a scattering layer.

FIGS. 10 and 11 illustrate various embodiments where light, guided with the light guide or otherwise within the overall structure, is scattered such that some portion of the light uniformly diffuses from the overall structure thereby providing some level of illumination. The scattering structures may be used in various combinations with the structures illustrated in FIGS. 7-9, as well as various other arrangement discussed herein. Beginning with FIG. 10, an adhesive layer 1000 is formed with an index of refraction greater than the bounding transparent layers (108, 110), which may be glass, such that the adhesive (or bonding) layer provides a light guide. Further, in this example, the adhesive layer is infused or coated with particles that scatter some light within the layer. For example, scattering particles may be infused in PVB used to bind glass plates. In another alternative, when scattering is desired, the transparent light guide may be a polycarbonate with scattering particles, or glass infused with particles. Alternatively, a scattering film 1010, see FIG. 11, may be provided on (deposited or bound) on one or both transparent layers (108, 110) between the light guide plate and the refractive layer, prior to binding the other transparent layer, or a scattering film may be placed on the binding agent prior to binding the transparent layers.

Figure 12:
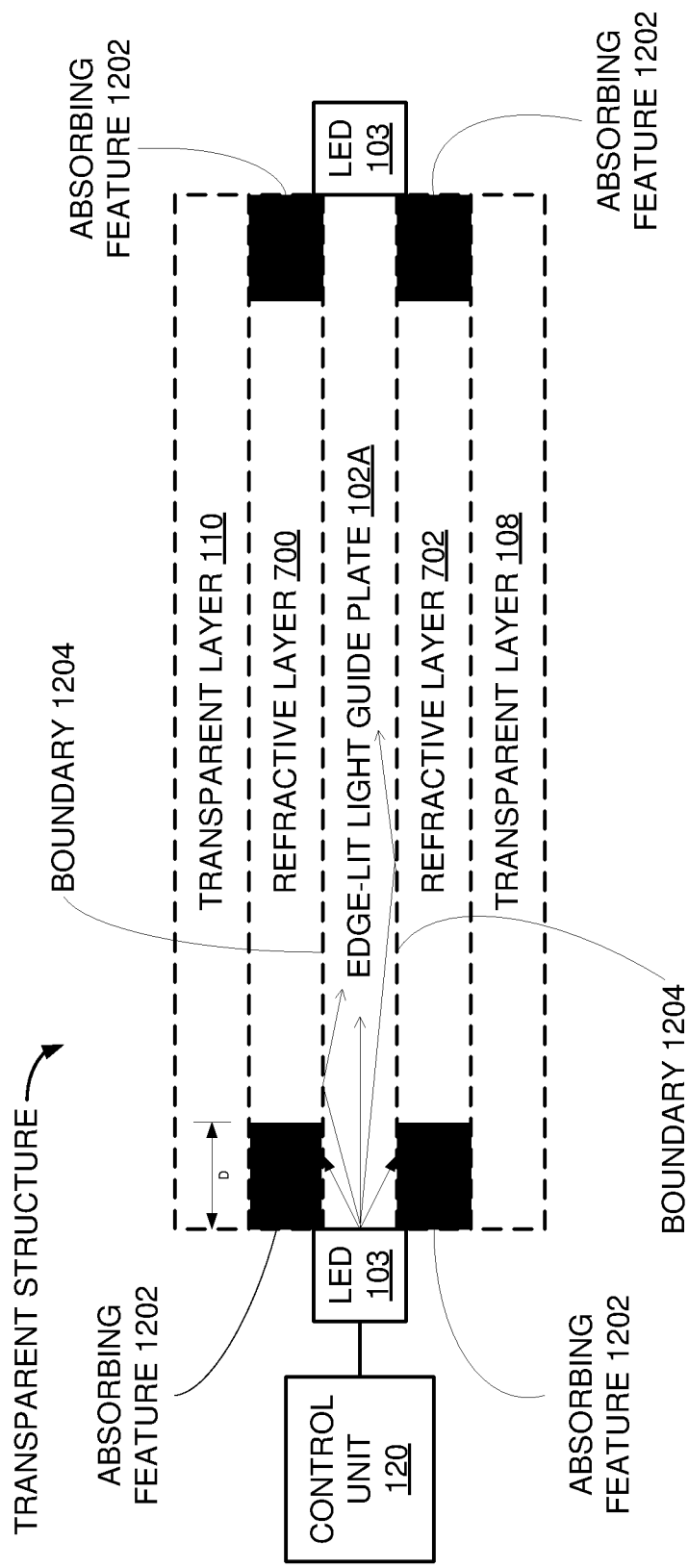
FIG. 12 is a side-view representation of a structure, which may be substantially transparent, that has a light source coupled into a light guide layer and with an absorbing feature that absorbs any light not internally reflected within the light guide layer.

FIG. 12 illustrates a structure 1200, which may be substantially transparent, having a light source, such as LEDs 103 discussed herein, coupled into a light guide layer 102A. The structure further includes an absorbing feature 1202, which may be considered a form of optical guide, in operable association with refractive layers (700, 702) that bound the light guide layer where the absorbing feature absorbs any light introduced into the edge-light guide and that is not internally reflected at a boundary 1204 between the refractive layers and the light guide. The absorbing feature may include a tint, a highly doped extrusion, a coating, a dense particle infusion, and other additions or modifications of the refractive layer, the light guide or otherwise that form an operable association between the absorbing feature and the light guide plate to absorb light not internally reflected. Hence, with the light absorbing feature any light that is internally reflected at a boundary between the light guide plate and the light guide layer will be guided along the light guide plate and other light, not internally reflected, will be absorbed. Such a structure may be used alone or in conjunction with a masking feature as described with respect to FIGS. 7-9, in various possible examples, as well as with other structures discussed herein.

Figure 13:
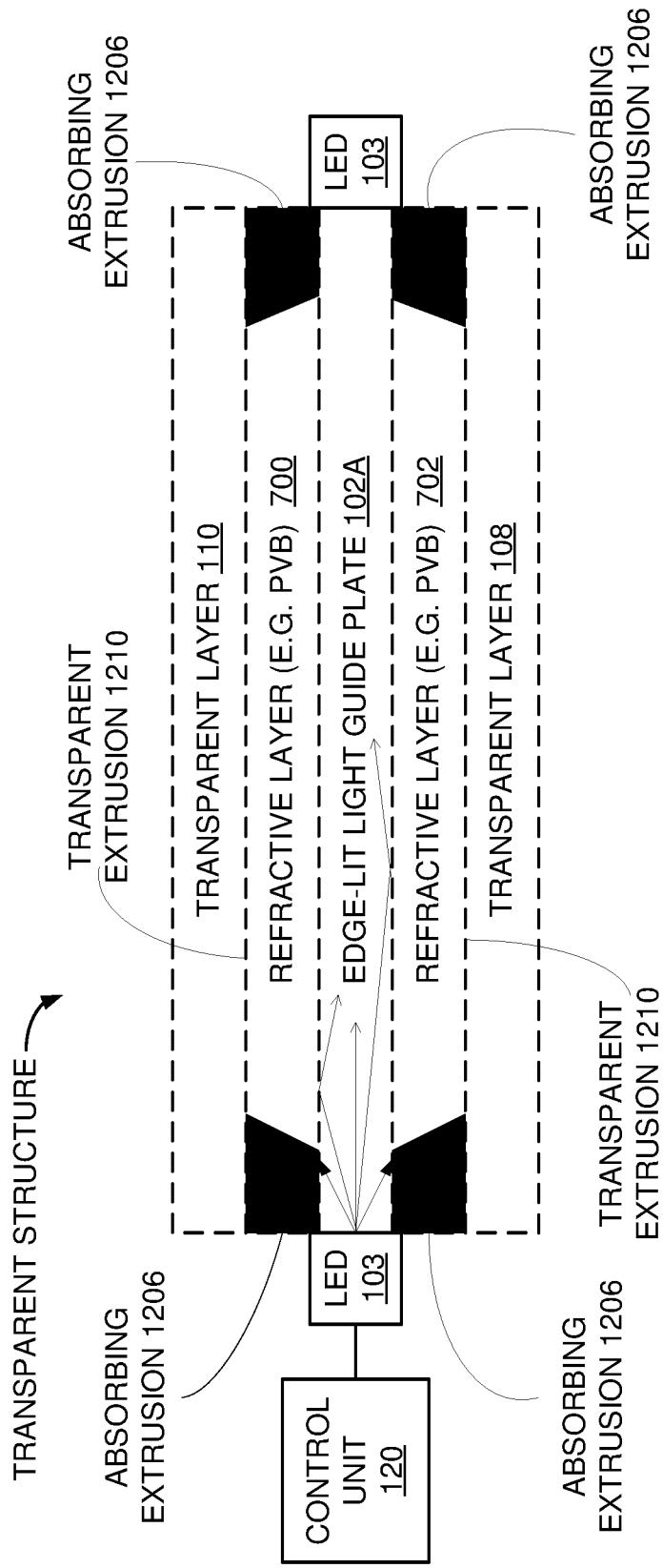
FIG. 13 is a side-view representation of a structure, which may be substantially transparent, that has a light source coupled with a light guide layer and with an absorbing feature in the form of a tinted, heavily doped or otherwise extruded refractive layer portion integral with a transparent extruded refractive layer.
Figure 14:
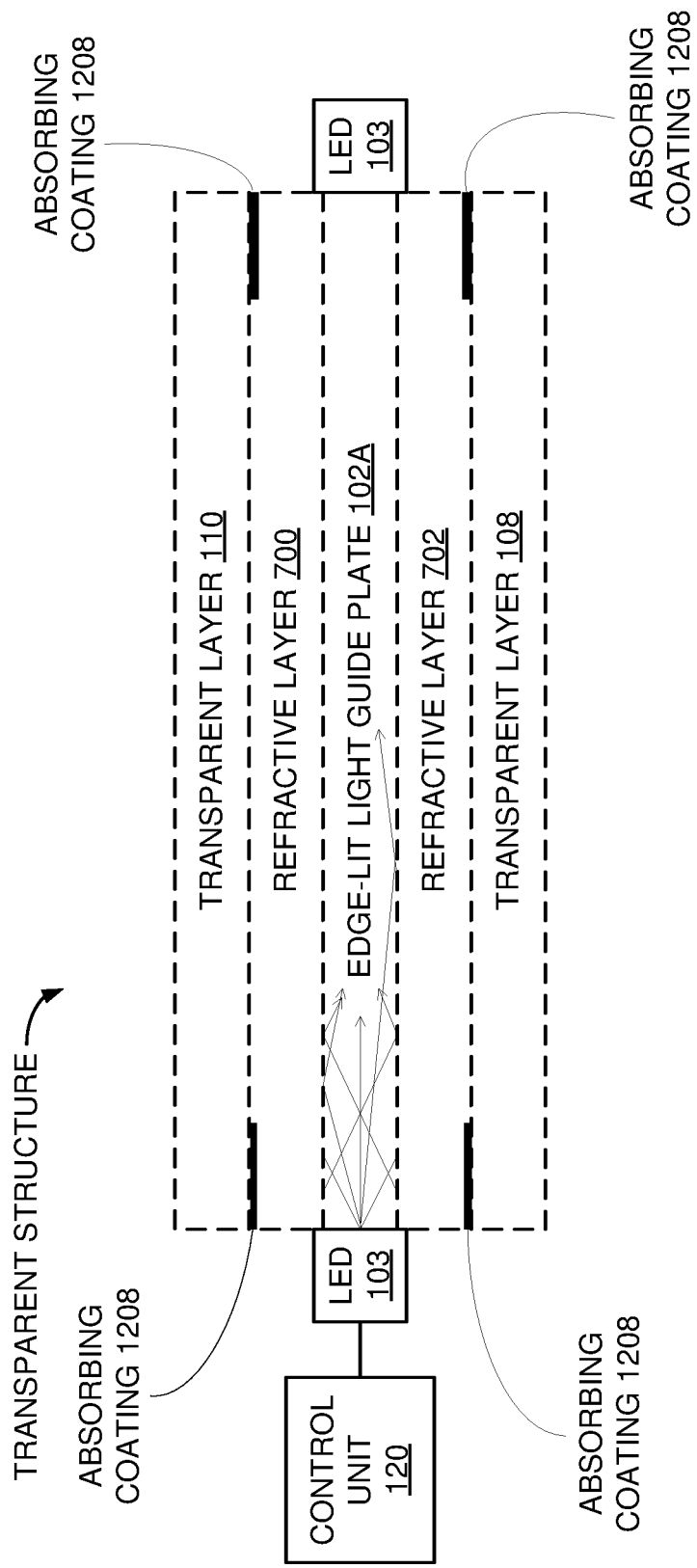
FIG. 14 is a side-view representation of a structure, which may be substantially transparent, that has a light source coupled with a light guide layer and with an absorbing feature in the form of a light absorbing coating.

In more detail, FIGS. 12-14 are representative side section views of examples of a layered transparent structure with a controllable edge lit light guide structure. The transparent structure may include a control unit 120 and one or more light sources, such as LEDS 103, discussed with respect to other embodiments herein. In these examples, light absorbing features are introduced to absorb any light exiting the light guide plate (not internally reflected), typically near where the light is introduced by the LEDS into the light guide plate. In an embodiment with one or more opposing light sources (on the opposite side of the plate and as shown) light would emit into the plate at both end areas, and absorbing features 1202 would be included at both end areas. The light guide plate 102A, in this example like other examples herein, is sandwiched between refractive layers (700, 702) such that the index of refraction for the light guide plate is greater than the refractive layers. The light absorbing feature, in one example, has the same refractive index as the light guide plate so that rays intersecting the absorbing feature pass into and are absorbed by the feature. In one specific example, the light guide plate may be acrylic with an index of refraction at about 1.49 and the refractive layers may be polyvinyl butyral (PVB) with an index of refraction of about 1.45. In various possible alternatives, the refractive layer, which may be an adhesive, may also include Ethylene-vinyl acetate (EVA), silicone, polyurethane, Sentryglas™, and the like. The combined structure forms a light guide through the light guide plate where photons from the light source intersecting the light guide plate/refractive layer boundary are guided through the light guide layer pursuant to principles of total internal reflection, which is illustrated by the rays exiting the light source and reflecting from the upper and lower refractive layers and otherwise staying within the light guide plate. In such an example, the absorbing feature may be coextruded with the refractive area with the absorbing feature portion have the same index as the light guide plate, and hence light rays incident at the absorbing feature area are not internally reflected and are absorbed.

As illustrated in FIG. 12, the absorbing feature 1202 is included to absorb any light intersecting the light guide/refractive layer boundaries at greater than the critical angle (as illustrated by the two example, uppermost and lowermost rays, intersecting the absorbing feature but not being reflected or passing through the refractive layer. Without, for example, a mask and associated aperture that is configured to allow light into the plate at an acceptance angle such that light stays within the plate, then some light from the LED may enter the light guide plate at an acceptance angle that would allow some rays to pass out of the light guide plate. Without the absorbing feature such rays that would otherwise be allowed to escape from the light guide into other layers and thereby interact with any defects or surface imperfection on the outer layers, e.g. the outer transparent layers. Hence, any such light that escapes the light guide layer is absorbed by the absorbing feature. The absorbing feature is dimensioned to extend at least as far as rays emitted from the LED would intersect the boundary at less than the critical angle and be reflected into and retained within the light guide plate. In the example shown in FIG. 12, the absorbing feature extends a distance D inward from the outer edge at the LED, along the boundary between the light guide plate and the refractive layer. In the example shown with opposing LEDs at each edge off the light guide, which may include LEDs distributed along both opposing edges of the light guide as illustrated in FIG. 7D (as well as other light sources such as discussed herein), each of the absorbing features, extending inwardly from each end as well as at the upper and lower boundaries, may extend inward the distance D.

In one specific example, the absorbing feature may be in the form of tinting of the light guide plate, or the corresponding refractive layer, extending inward along the distance D between the light guide plate and the refractive layer. Alternatively, as shown in FIG. 13, the refractive layer may be extruded in two or more phases, with one phase including tinting and other transparent. For example, in a coextrusion, an absorbing extrusion 1208 may be formed by extruding a portion of the refractive layer with a high doping concentration to form a dark absorbing tint of the PVB, and a transparent extrusion 1210 of the refractive layer without such doping to provide a transparent refractive layer (700, 702). Such doping may be achieved by including light absorbing die particles in the extrusion mixture for the portion of the refractive layer where the absorbent feature is intended. In one example, tinting or high doping concentration, may extend inward from the edge based on the critical angle, and may extend in a range of 1 mm to 2 cm. Further, to account for any slight imprecision in centering the LED along the outer edge of the light guide (adjacent the LED), thickness variations in the edge light guide, manufacturing variations of the LED, and the like, the inward extent (e.g., D) (e.g., 1208, 1202, 1204) of the absorbing feature may be greater than required for a perfect centering as some rays, may intersect the plate/refractive layer boundary with an incident angle allowing the ray to enter the refractive layer (not be internally reflected) at a greater distance from the edge than otherwise might be encountered with a perfectly centered LED or otherwise.

In yet another alternative, FIG. 14 illustrates an absorbing feature 1208 in the form of a light absorbent coating placed on the refractive layer (700, 702) adjacent the respective transparent layers (108, 110). Since the refractive layer may be quite thin, the length of the absorbing feature (e.g., coating) from the edge may be similar to that described with respect to FIGS. 12 and 13. In an alternative, the coating may be placed on the light guide plate. Like previously described embodiments, the coating is one that absorbs incident light from the light source.

The light guide plate may include diffusing elements that cause some light emission from the light guide plate. Hence, the absorbing features may only be positioned adjacent to or otherwise proximate the light source (or sources) where emission are intended to be absorbed or otherwise controlled, and/or eliminated or restricted.

Figure 15A:
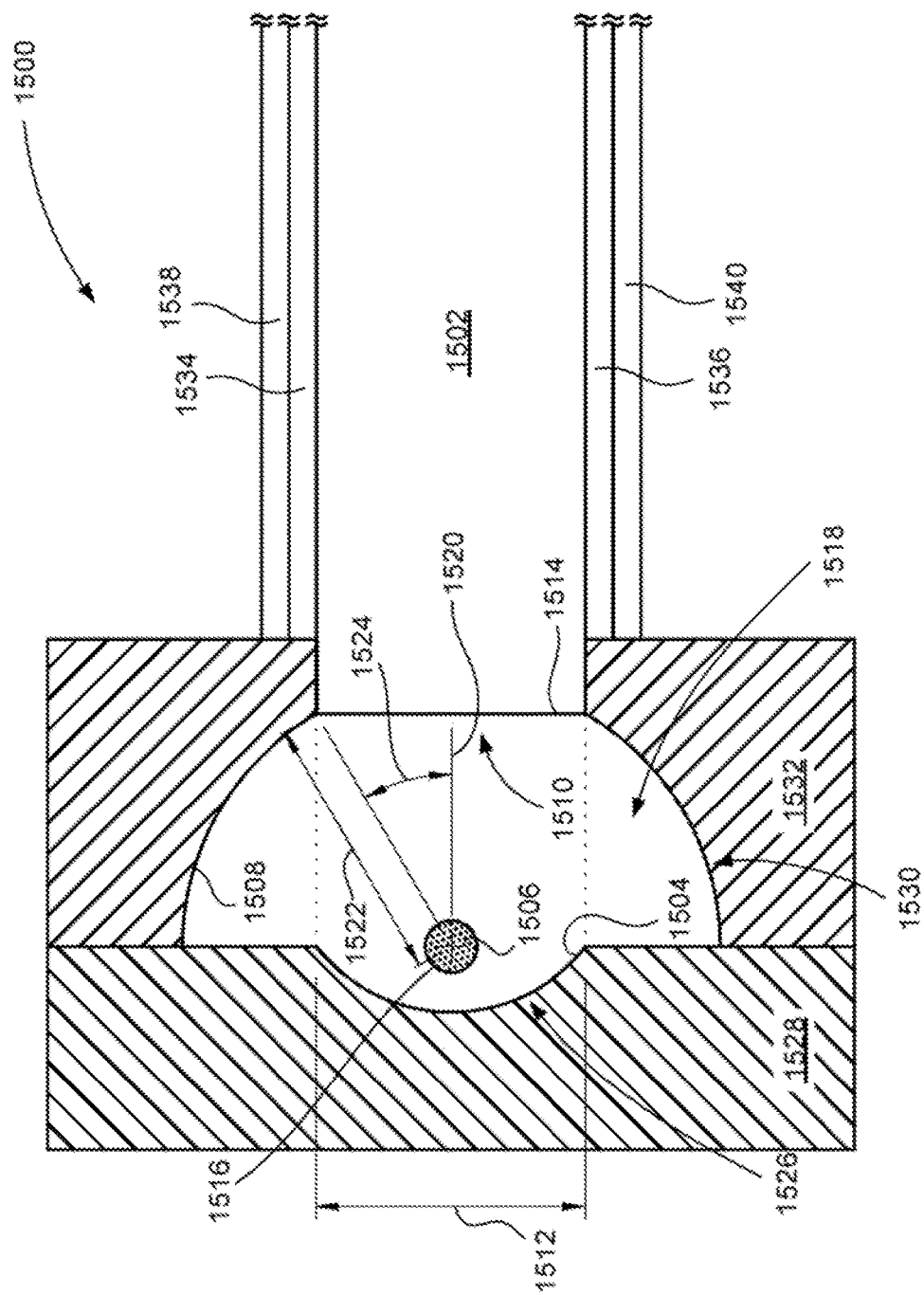
FIG. 15A is a side-view representation, in cross-section, of an optical guide for guiding light from a light source into a light-guide plate.
Figure 15B:
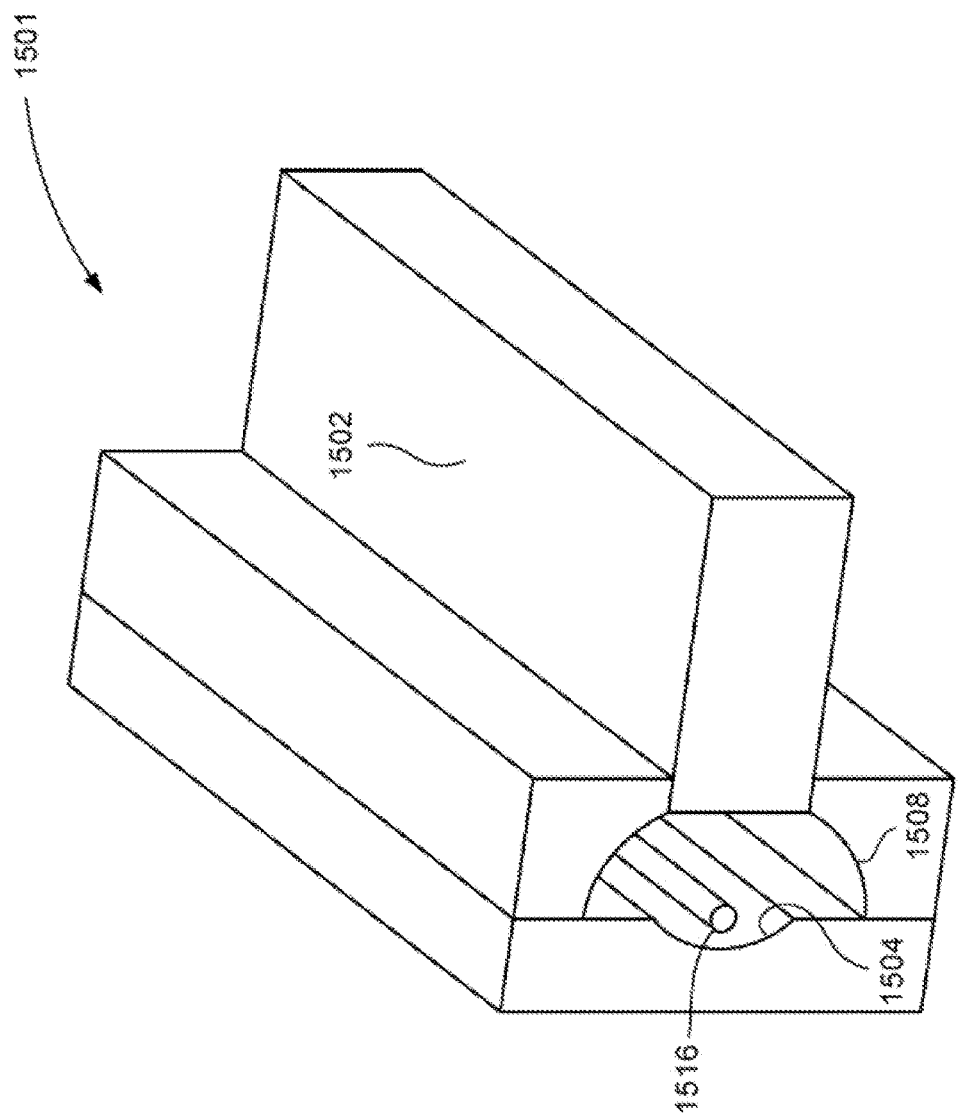
FIG. 15B is an isometric view of a representative optical guide derived using the cross-sectional side view of FIG. 15A.

FIG. 15A is a side-view representation, in cross-section, of an optical guide 1500 for guiding light from a light source, such as an LED, into a light-guide plate 1502. FIG. 15B is a perspective view of a representative optical guide 1501 derived using the cross-sectional side view of FIG. 15A. For clarity, only some features of FIG. 15A are depicted in FIG. 15B for the representative optical guide 1501. The light-guide plate 1502 may be analogous to the transparent light-carrying layer 102 of FIG. 1 or the edge-lit light guide plate 2A of FIG. 2A.

The optical guide 1500 includes a parabolic reflector 1504 having a focal point 1506. In FIG. 15A, the focal point is shown by a centermark 1506. The optical guide also includes a cylindrical reflector 1508 facing the parabolic reflector 1504. The cylindrical reflector 1508 has a center of curvature coincident with the focal point of the parabolic reflector 1504. An aperture 1510 is disposed through the cylindrical reflector 1508 and has a width equal to an optical width of the parabolic reflector 1504. In FIG. 15A, the optical width is indicated by a vertical distance 1512 between extension lines. The aperture 1510 is disposed opposite of the optical width (i.e., opposite of an "opening" of the parabolic reflector 1504).

The optical guide 1500 is coupled with the light-guide plate 1502 (i.e., includes the light-guide plate 1502), a portion of which, may be disposed within the aperture 1510. The light-guide plate 1502 has a thickness equal to the optical width of the parabolic reflector 1504. Such equality, however, may be within a tolerance. For example, and without limitation, the light-guide plate 1502 may have a thickness within a tolerance of ±10% of the optical width of the parabolic reflector 1504. Other non-limiting examples of the tolerance include ±0.5%, ±1%, ±1.5%, ±2%, ±2.5%, ±3%, ±3.5%, ±4%, ±4.5%, and ±5%. In general, however, the tolerance may be any tolerance between ±0% to ±10%.

It will be understood that the width of the aperture 1510 may be slightly greater than the thickness of the light-guide plate 1502 (i.e., slightly greater than the optical width of the parabolic reflector 1504) to allow the light-guide plate 1502 to fit into the aperture 1510. This fit may involve materials for lubrication, bonding, or both (e.g., an optical adhesive, an optical grease, etc.). The fit may also involve overmolding or extruding the cylindrical reflector 1508 onto the light-guide plate 1502. The portion of the light-guide plate 1502 within the aperture 1510 may include an entrance facet 1514 to receive light. The entrance facet 1514 may be a flat surface oriented parallel to the optical width of the parabolic reflector 1504, such as shown in FIGS. 15A & 15B. However, other shapes are possible (e.g., a concave surface, a grated surface, etc.).

The optical guide 1500 also includes an optical fiber 1516 disposed at the focal point of the parabolic reflector 1504. The optical fiber 1516 is configured to scatter light radially outward while transmitting light therethrough and may be configured similar to the "leaky" fiber described in relation to FIGS. 8A & 8B. Such scattering allows the optical fiber 1516 to emit light into a cavity 1518 defined, in part, by the parabolic reflector 1504 and the cylindrical reflector 1508. In some embodiments, the optical guide 1500 includes a light source optically coupled with the optical fiber 1516 (e.g., coupled to an end of the optical fiber). The light source may include a light-emitting diode (LED). In some embodiments, the optical fiber 1516 is positioned at the focal point by a transparent body, which may be a molding. The transparent body may be ridged. In further embodiments, the transparent body fills the cavity 1518. The transparent body (or molding) may be extruded over or co-extruded with the optical fiber 1516. The transparent body may also involve an optical epoxy or resin disposed into the cavity 1518 to cure and thereby position the optical fiber 1516 at the focal point.

It will be appreciated that the light-guide plate 1502 accepts light within an angular extent less than an acceptance angle, $\theta_a$. In general, the acceptance angle is defined relative to a direction of normal incidence positioned midway between the thickness of the light-guide plate and parallel thereto (see extension line 1520). The acceptance angle of the light-guide plate 1502 is influenced by refractive indices of the light-guide plate 1502. Non-limiting examples of such refractive indices include a refractive index of a material forming the light-guide plate 1502, a refractive index of an optical cladding layer disposed on the light-guide plate 1502 (e.g., see refractive layers 104, 105 in FIGS. 8A & 8B). The acceptance angle is also influenced by a refractive index of space adjacent the light-guide plate 1502, such as a refractive index of the cavity 1518. In some instances, the cavity 1518 may be filled with air. In other instances, the cavity 1518 may be filled with material, such as the transparent body for positioning and securing the optical fiber 1516 along the focal point. In some instances, the entrance facet 1514 may be coupled to (or coated with) a material for reducing reflections off of the light-guide plate 1502.

The aperture 1510 functions to limit the angular extent of light delivered to the light-guide plate 1502 to that within the acceptance angle. Moreover, the acceptance angle and the thickness of the light-guide plate 1502 govern a radius of curvature for the cylindrical reflector 1508, which in turn, determines the center of curvature for the cylindrical reflector 1508. In FIG. 15A, the radius of curvature is indicated by a canted distance 1522 between extension lines. Similarly, the acceptance angle is indicated by an angular distance 1524 between extension lines, one of which is the direction of normal incidence 1520. From considerations of geometry, the radius of curvature, the thickness of the light-guide plate 1502, and the acceptance angle are related by:

$$r = \frac{t/2}{\sin\theta_a} \qquad \text{Equation (1)}$$

where r is the radius of curvature; t is the thickness of the light-guide plate 1502; and $\theta_a$ is the acceptance angle. Equation (1) therefore describes how the radius of curvature is governed by the acceptance angle and the thickness of the light-guide plate 1502. Furthermore, by virtue of the focal point being located within a plane defined by the optical width, the focal point is a distance of t/4 from a vertex of the parabolic reflector 1504 (i.e., along the direction of normal incidence 1520). The aforementioned parameters and their relationships characterize a manner in which the optical guide 1500 provides a compact and efficient coupling of light from a light source to the light-edge plate 1502 (e.g. from an externally-located light source).

Figure 16:
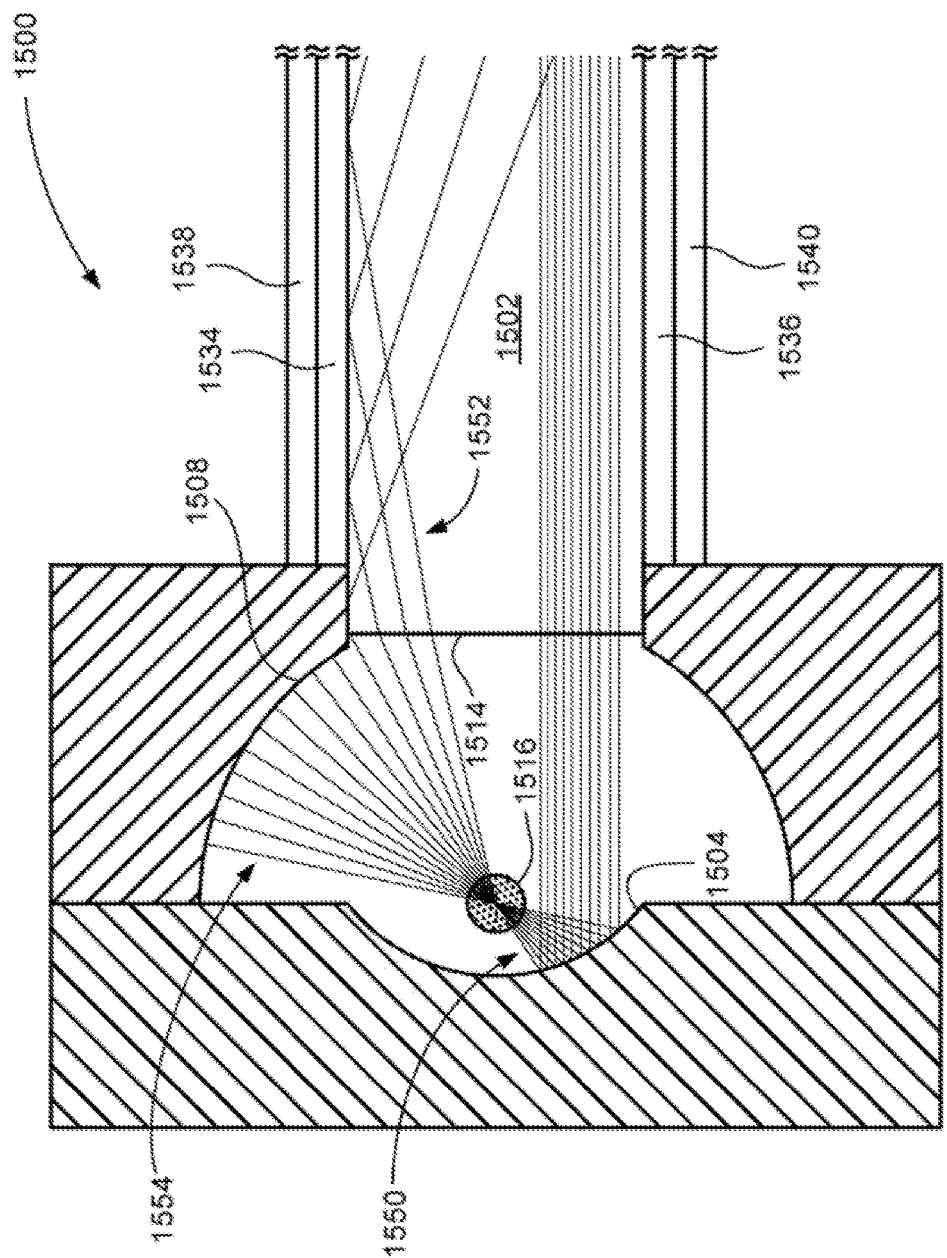
FIG. 16 is a side-view representation, in cross-section, of the optical guide of FIG. 15A, but illustrating a portion of light scattered by the optical fiber.

In operation, the optical fiber 1516 receives light from the light source, which may be a light-emitting diode located external to the optical guide 1500. This light is scattered radially outward from an interior of the optical fiber 1516, i.e., outward from the focal point. FIG. 16 is a side-view representation, in cross-section, of the optical guide 1500 of FIG. 15A, but illustrating a portion of light scattered by the optical fiber 1516. For clarity, only certain features of FIG. 15A are labeled in FIG. 16. Light scattered by optical fiber 1516 travels along optical pathways that include three dominant paths. These three dominant paths are allowed by a selective positioning and configuration of the parabolic reflector 1504, the cylindrical reflector 1508, the light-guide plate 1502, and the optical fiber 1516, as described above.

Along a first path, light is emitted from the focal point to the parabolic reflector 1504 (i.e., see light rays 1550). Upon interacting with the parabolic reflector 1504, such light is collimated and traverses the entrance facet 1514 in a direction parallel to the light-guide plate 1502. Along a second path, light is emitted from the focal point within the acceptance angle of the light-guide plate 1502 (see light rays 1552). Such light is received through the entrance facet 1514 and travels along the light-guide plate 1502 in a guided mode (i.e., via internal reflection).

Along a third path, light is emitted from the focal point towards the cylindrical reflector 1508 (see light rays 1554). Upon interacting with the cylindrical reflector 1508, such light is reflected back through the focal point towards the parabolic reflector 1504 (i.e., back along its originating path). Upon leaving the focal point, this light behaves similar to light along the first path (i.e., becomes collimated to traverse the entrance facet 1514).

Figure 17:
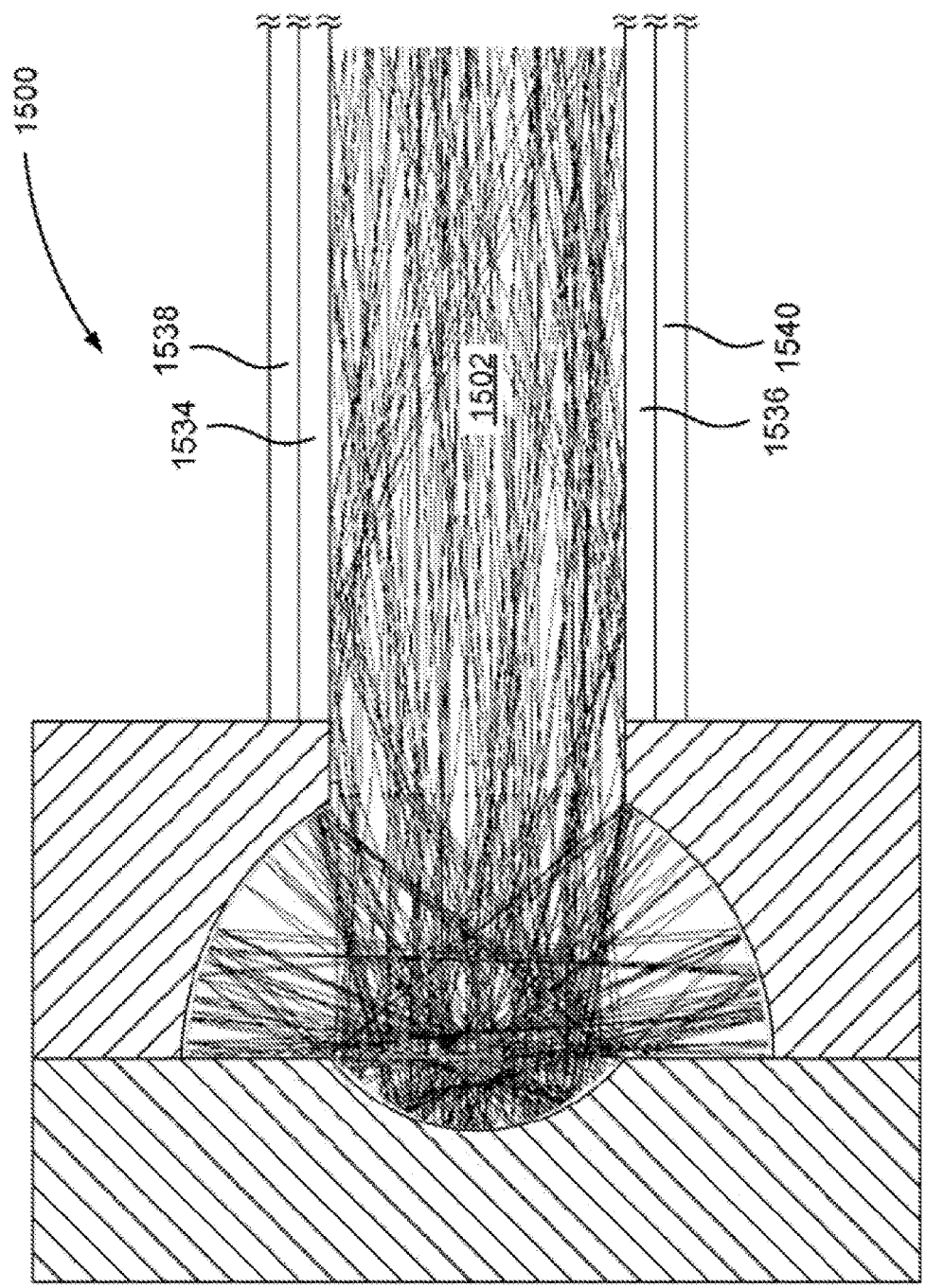
FIG. 17 is a side-view representation, in cross-section, of the optical guide of FIG. 15A, but with light simulated as being coupled to the light-guide plate.

The three dominant paths of the optical guide 1500 can be over 90% efficient, as determined by computer simulations, in coupling light from the light source to the light-guide plate 1502. FIG. 17 is a side-view representation, in cross-section, of the optical guide 1500 of FIG. 15A, but with light simulated as being coupled to the light-guide plate 1502. This simulated light represents a highly-dense flux of light through the light-guide plate 1502. It will be appreciated that this highly-dense flux of light be used to efficiently produce a small angular cone of light in one direction, such as for a direct illuminator or luminaire. This highly-dense flux of light can also be used to efficiently provide light for informational displays. Such informational displays may provide static and/or dynamic information, including, but not limited to, textual information (e.g., reading material, driving directions, etc.), graphical information (e.g., maps, decorative graphics, star field displays, and so on), video information, and the like. As such, the optical guide 1500 allows a small form factor that, in many embodiments, can be less than 3 mm thick (i.e., 3 mm vertically in FIGS. 15A-17). Such small, discrete packaging can eliminate a need for strip lighting sources (e.g., strips of light-emitting diodes). Also, by reducing a quantity of light sources and their concomitant heat, the small, discrete packaging can mitigate a need for thermal regulation (e.g., via heat sinks). Other benefits are possible.

In some embodiments, such as shown in FIGS. 15A-17, the parabolic reflector 1504 is defined by a first trough 1526 in a first body 1528 and the cylindrical reflector 1508 is defined by second trough 1530 in a second body 1532. In these embodiments, the first body 1528 is coupled to the second body 1532 to form a cavity therebetween (i.e., the cavity 1518). The cavity 1518 includes the second trough 1530 disposed opposite the first trough 1526. Non-limiting examples of materials for the first body 1528 and the second body 1532 include resin, glass, or plastic. Such materials are mirrored on surfaces corresponding to at least the first trough 1526 and the second trough 1532. In further embodiments, the first body 1528 and the second body 1532 form a single body. Also, in further embodiments, at least one of the first body 1528 and the second body 1532 are co-extruded with the light-guide plate 1502 to form an extruded single body.

Similar to the embodiments described in relation to FIGS. 7A-7D, 8A-8B, and 9-14, a refractive layer may be disposed on a surface of the light-guide plate 1502 (e.g., an optical cladding layer). In some embodiments, such as shown in FIGS. 15A-17, a first refractive layer 1534 and a second refractive layer 1536 sandwich the light-guide plate 1502 therebetween. Protective layers may be used to cover refractive layers for the light-guide plate 1502. In some embodiments, a refractive layer is disposed on a surface of the light-guide plate 1502 and a transparent layer is disposed over the refractive layer. For example, and without limitation, a first transparent layer 1538 may be disposed over the first refractive layer 1534 and a second transparent layer 1540 may be disposed over the second reflective layer 1536, as shown in FIGS. 15A-17. In FIGS. 15A-17, the refractive layers 1536, 1538 and the transparent layers 1538, 1540 are depicted as exterior to the aperture 1510. However, this depiction is not intended as limiting. In some embodiments, one or both of the refractive or transparent layers may extend into the aperture 1520.

In some embodiments, the light-guide plate 1502 is positioned adjacent a switchable light extraction layer and in optical communication therewith (e.g., see embodiments described in relation to FIGS. 1 and 2A). In some embodiments, the light-guide plate 1502 is positioned adjacent a switchable mirror layer and in optical communication therewith (e.g., see embodiments described in relation to FIGS. 1 and 2A).

In some embodiments, the light-guide plate 1502 protrudes out of the aperture 1510 a multiple of the thickness of the light-guide plate 1502. Non-limiting examples of the multiple include 1 times the thickness, 2 times the thickness, 5 times the thickness, and 10 times the thickness. Other multiples are possible.

According to a representative example, an optical guide includes a parabolic reflector in optical communication with a cylindrical reflector through a common focal point. The optical guide may be analogous to those depicted in FIGS. 15A-17. The parabolic reflector disposed across from the cylindrical reflector. The optical guide also includes an optical plate having a portion disposed within an aperture through the cylindrical reflector. The optical plate functions as a light-guide plate and may include a refractive layer disposed thereon. A transparent layer may be disposed over the refractive layer. The aperture is disposed across from the parabolic reflector and has a width equal to an opening of the parabolic reflector. The opening of the parabolic reflector defines an optical width for receiving light (i.e., for subsequent reflection). The optical guide additionally includes a light source disposed at the common focal point and configured emit light radially outward towards at least one of the parabolic reflector, the cylindrical reflector, or the portion of the optical plate.

In some embodiments, the optical plate has a thickness equal to the width of the aperture. In these embodiments, the portion of the optical plate may include a surface facing the parabolic reflector and defining an entrance facet for the optical plate. The entrance facet may have an acceptance angle for light. The acceptance angle, $\theta_a$, a radius of curvature of the cylindrical reflector, r, and the thickness of the optical plate, t, are related by $r=(t/2)/\sin \theta_a$. It will be appreciated that the radius of curvature originates from the common focal point to terminate on a reflective surface of the cylindrical reflector. In further embodiments, the common focal point is a distance of t/4 from a vertex of the parabolic reflector.

The equality between the width of the aperture and the opening of the parabolic reflector may include a tolerance. Similarly, the equality between the thickness of the optical plate and the width of the aperture may also include a tolerance. These tolerances may have any value between ±0% to ±10%. Non-limiting examples of these tolerances include ±0.5%, ±1%, ±1.5%, ±2%, ±2.5%, ±3%, ±3.5%, ±4%, ±4.5%, ±5%, and ±±10%.

In some embodiments, the light source includes an optical fiber optically-coupled to a light-emitting diode. The optical fiber is configured to scatter light radially outward upon receiving light from the light-emitting diode.

Figure 18:
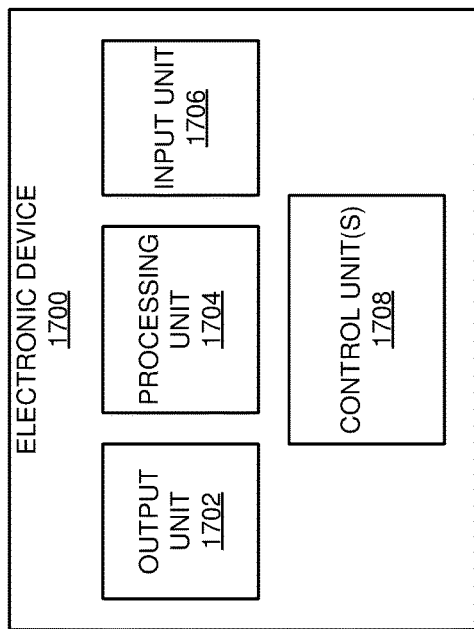
FIG. 18 is a functional block diagram of an electronic device including operational units arranged to perform various operations of the presently disclosed technology.

Turning to FIG. 18, an electronic device 1700 including operational units 1702-1708 arranged to perform various operations of the presently disclosed technology is shown. The operational units 1702-1708 of the device 1700 may be implemented by hardware or a combination of hardware and software to carry out the principles of the present disclosure. It will be understood by persons of skill in the art that the operational units 1702-1708 described in FIG. 18 may be combined or separated into sub-blocks to implement the principles of the present disclosure. Therefore, the description herein supports any possible combination or separation or further definition of the operational units 1702-1708. Moreover, multiple electronic devices 1700 may be employed in various embodiments.

In one implementation, the electronic device 1700 includes an output unit 1702 configured to provide information, including possibly display information, such as by way of a graphical user interface, and a processing unit 1704 in communication with the output unit 1702 and an input unit 1706 configured to receive data from one or more input devices or systems. Various operations described herein may be implemented by the processing unit 1704 using data received by the input unit 1706 to output information using the output unit 1702.

Additionally, in one implementation, the electronic device 1700 includes one or more control units 1708 implementing various operations discussed herein.

Figure 19:
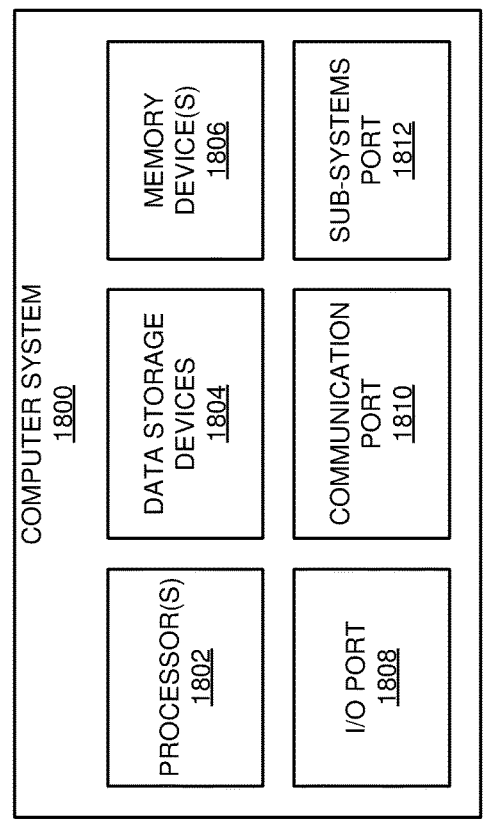
FIG. 19 is an example computing system that may implement various systems and methods of the presently disclosed technology.

Referring to FIG. 19, a detailed description of an example computing system 1800 having one or more computing units that may implement various systems and methods discussed herein is provided. The computer system 1800 may be a computing system is capable of executing a computer program product to execute a computer process. Data and program files may be input to the computer system 1800, which reads the files and executes the programs therein. Some of the elements of the computer system 1800 are shown in FIG. 19, including one or more hardware processors 1802, one or more data storage devices 1804, one or more memory devices 1806, and/or one or more ports 1808-1812. Additionally, other elements that will be recognized by those skilled in the art may be included in the computing system 1800 but are not explicitly depicted in FIG. 19 or discussed further herein. Various elements of the computer system 1800 may communicate with one another by way of one or more communication buses, point-to-point communication paths, or other communication means not explicitly depicted in FIG. 19.

The processor 1802 may include, for example, a central processing unit (CPU), a microprocessor, a microcontroller, a digital signal processor (DSP), and/or one or more internal levels of cache. There may be one or more processors 1802, such that the processor 1802 comprises a single central-processing unit, or a plurality of processing units capable of executing instructions and performing operations in parallel with each other, commonly referred to as a parallel processing environment.

The computer system 1800 may be a conventional computer, a distributed computer, or any other type of computer, such as one or more external computers made available via a cloud computing architecture. The presently described technology is optionally implemented in software stored on the data stored device(s) 1804, stored on the memory device(s) 1806, and/or communicated via one or more of the ports 1808-1812, thereby transforming the computer system 1800 in FIG. 19 to a special purpose machine for implementing the operations described herein. Examples of the computer system 1800 include personal computers, terminals, workstations, mobile phones, tablets, laptops, personal computers, multimedia consoles, gaming consoles, set top boxes, embedded computing and processing systems, and the like.

The one or more data storage devices 1804 may include any non-volatile data storage device capable of storing data generated or employed within the computing system 1800, such as computer executable instructions for performing a computer process, which may include instructions of both application programs and an operating system (OS) that manages the various components of the computing system 1800. The data storage devices 1804 may include, without limitation, magnetic disk drives, optical disk drives, solid state drives (SSDs), flash drives, and the like. The data storage devices 1804 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 1806 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 1804 and/or the memory devices 1806, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 1800 includes one or more ports, such as an input/output (I/O) port 1808, a communication port 1810, and a sub-systems port 1812, for communicating with other computing, network, or vehicle devices. It will be appreciated that the ports 1808-1812 may be combined or separate and that more or fewer ports may be included in the computer system 1800.

The I/O port 1808 may be connected to an I/O device, or other device, by which information is input to or output from the computing system 1800. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 1800 via the I/O port 1808. Similarly, the output devices may convert electrical signals received from computing system 1800 via the I/O port 1808 into signals that may be sensed as output by a human, such as sound, light, and/or touch. The input device may be an alphanumeric input device, including alphanumeric and other keys for communicating information and/or command selections to the processor 1802 via the I/O port 1808. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 1800 via the I/O port 1808. For example, an electrical signal generated within the computing system 1800 may be converted to another type of signal, and/or vice-versa. In one implementation, the environment transducer devices sense characteristics or aspects of an environment local to or remote from the computing device 1800, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 1800, such as, physical movement of some object (e.g., a mechanical actuator), heating or cooling of a substance, adding a chemical substance, and/or the like.

In one implementation, a communication port 1810 is connected to a network by way of which the computer system 1800 may receive network data useful in executing the methods and systems set out herein as well as transmitting information and network configuration changes determined thereby. Stated differently, the communication port 1810 connects the computer system 1800 to one or more communication interface devices configured to transmit and/or receive information between the computing system 1800 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 1810 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 1810 may communicate with an antenna for electromagnetic signal transmission and/or reception. In some examples, an antenna may be employed to receive Global Positioning System (GPS) data to facilitate determination of a location of a machine, vehicle, or another device.

The computer system 1800 may include a sub-systems port 1812 for communicating with one or more systems related to a vehicle to control an operation of the vehicle and/or exchange information between the computer system 1800 and one or more sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, information and software relating to the configuration and control of a configurable transparent structure, as described above, as well as other modules and services, may be embodied by instructions stored on the data storage devices 1804 and/or the memory devices 1806 and executed by the processor 1802. The computer system 1800 may be integrated with or otherwise form part of a vehicle. In some instances, the computer system 1800 is a portable device that may be in communication and working in conjunction with various systems or sub-systems of a vehicle.

The present disclosure recognizes that the use of such information may be used to the benefit of users. For example, the configuration and control information of a configurable transparent structure of a vehicle may be employed to provide a useful and secure lighting and viewing environment for occupants of the vehicle.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

The system set forth in FIG. 19 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium; optical storage medium; magneto-optical storage medium; read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the disclosure is not so limited. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A transparent structure, comprising:
   a light source;
   a light-carrying layer optically coupled with the light source and configured to distribute light from the light source through the light-carrying layer by total internal reflection; and
   a light extraction layer that is controllable to define an amount of haziness by scattering the light, wherein the amount of haziness varies based on an applied voltage.

2. The transparent structure of claim 1, wherein the light extraction layer is transparent when the applied voltage is equal to or greater than a predetermined voltage.

3. The transparent structure of claim 1, wherein the light extraction layer is opaque when the applied voltage is zero volts.

4. The transparent structure of claim 1, wherein the light extraction layer is a polymer dispersed liquid crystal (PDLC) film.

5. The transparent structure of claim 1, wherein the light extraction layer is a suspended particle device.

6. The transparent structure of claim 1, wherein the light extraction layer is an electrochromic device.

7. The transparent structure of claim 1, wherein the light-carrying layer is an edge-lit light guide.

8. The transparent structure of claim 1, further comprising:
   a first transparent layer; and
   a second transparent layer,
   wherein the light-carrying layer and the light extraction layer are positioned between the first transparent layer and the second transparent layer.

9. A transparent structure, comprising:
   a light source that is configured to emit light;
   a light-carrying layer optically coupled with the light source and configured to distribute the light from the light source; and
   a mirror layer that is controllable according to an applied voltage to switch between a transparent state, in which the light is passed through the mirror layer, and a mirror state, in which the light is reflected back toward the light-carrying layer.

10. The transparent structure of claim 9, wherein the mirror layer is in the transparent state when the applied voltage is equal to or greater than a predetermined voltage.

11. The transparent structure of claim 9, wherein the mirror layer is in the mirror state when the applied voltage is zero volts.

12. The transparent structure of claim 9, wherein the mirror layer is a transition-metal switchable mirror.

13. The transparent structure of claim 9, wherein the light-carrying layer is an edge-lit light guide.

14. The transparent structure of claim 9, further comprising:
   a first transparent layer; and
   a second transparent layer,
   wherein the light-carrying layer and the mirror layer are positioned between the first transparent layer and the second transparent layer.

15. A transparent structure, comprising:
   a light source that is configured to emit light;
   an edge-lit light guide plate optically coupled with the light source;
   a switchable light extraction layer in optical communication with the edge-lit light guide plate and configured to switch between a transparent state and a translucent state in response to a magnitude of a first applied voltage; and
   a switchable mirror layer in optical communication with the edge-lit light guide plate and configured to switch between a transparent state and a mirror state in response to a magnitude of a second applied voltage.

16. The transparent structure of claim 15, wherein the edge-lit light guide plate includes surface patterning that is configured to direct at least some of the light out of the edge-lit light guide plate.

17. The transparent structure of claim 15, wherein the edge-lit light guide plate includes volume patterning that is configured to direct at least some of the light out of the edge-lit light guide plate.

18. The transparent structure of claim 15, wherein the edge-lit light guide plate includes a diffuse material that is configured to direct at least some of the light out of the edge-lit light guide plate.

19. The transparent structure of claim 15, wherein the switchable light extraction layer is located on a first side of the edge-lit light guide plate and the switchable mirror layer is located on a second side of the edge-lit light guide plate.

20. The transparent structure of claim 15, further comprising:
   a control unit that is configured to control the switchable light extraction layer by application of the first applied voltage to the switchable light extraction layer and to control the switchable mirror layer by application of the second applied voltage to the switchable mirror layer.

* * * * *